United States Patent
Yamauchi et al.

(10) Patent No.: US 9,793,555 B2
(45) Date of Patent: *Oct. 17, 2017

(54) MEMBRANE ELECTRODE ASSEMBLY WITH GAS DIFFUSION LAYERS HAVING A RIB POROSITY AND METHOD OF MANUFACTURING THE SAME, AS WELL AS FUEL CELL

(75) Inventors: Masaki Yamauchi, Osaka (JP); Yoichiro Tsuji, Osaka (JP); Naotsugu Koashi, Kyoto (JP); Hideo Kasahara, Osaka (JP); Takashi Nakagawa, Osaka (JP); Yoko Yamamoto, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 926 days.

This patent is subject to a terminal disclaimer.

(21) Appl. No.: 13/144,181

(22) PCT Filed: Aug. 31, 2010

(86) PCT No.: PCT/JP2010/005348
§ 371 (c)(1),
(2), (4) Date: Jul. 12, 2011

(87) PCT Pub. No.: WO2011/027539
PCT Pub. Date: Mar. 10, 2011

(65) Prior Publication Data
US 2012/0021329 A1      Jan. 26, 2012

(30) Foreign Application Priority Data

Sep. 1, 2009    (JP) ................................. 2009-201386
Aug. 9, 2010    (JP) ................................. 2010-178321

(51) Int. Cl.
*H01M 8/10*      (2016.01)
*H01M 8/00*      (2016.01)
(Continued)

(52) U.S. Cl.
CPC ......... *H01M 8/026* (2013.01); *H01M 8/0243* (2013.01); *H01M 8/0234* (2013.01);
(Continued)

(58) Field of Classification Search
CPC .. H01M 4/861; H01M 4/8807; H01M 8/1002; H01M 4/8605
(Continued)

(56) References Cited

U.S. PATENT DOCUMENTS 5,252,410 A     10/1993   Wilkinson et al.
6,331,224 B1    12/2001   Seko et al.
(Continued)

FOREIGN PATENT DOCUMENTS

JP    59-214161    12/1984
JP    61-091875     5/1986
(Continued)

OTHER PUBLICATIONS

International Search Report dated Dec. 14, 2010 in corresponding International (PCT) Application No. PCT/JP2010/005348.
(Continued)

*Primary Examiner* — Barbara Gilliam
*Assistant Examiner* — Adam A Arciero
(74) *Attorney, Agent, or Firm* — Wenderoth, Lind & Ponack, L.L.P.

(57) ABSTRACT

In order to provide a membrane electrode assembly that can further improve power generation performances of a fuel cell, the present invention allows a rib portion (22) that separates mutually adjacent gas flow passages (21) from each other to have a porosity lower than the porosity of a lower area (23) of the rib portion. Thus, it is possible to suppress the deformation of the rib portion and excessive
(Continued)

permeation of a reaction gas, and consequently to further improve the power generation performances.

11 Claims, 20 Drawing Sheets

(51) Int. Cl.
 *H01M 8/026* (2016.01)
 *H01M 8/0243* (2016.01)
 *H01M 8/0234* (2016.01)
 *H01M 8/0239* (2016.01)
 *H01M 8/1018* (2016.01)

(52) U.S. Cl.
 CPC .. *H01M 8/0239* (2013.01); *H01M 2008/1095* (2013.01); *Y02P 70/56* (2015.11)

(58) Field of Classification Search
 USPC .......................................................... 429/534
 See application file for complete search history.

(56) References Cited

U.S. PATENT DOCUMENTS

| | | | |
|---|---|---|---|
| 6,350,540 B1 * | 2/2002 | Sugita et al. .................. | 429/505 |
| 6,835,477 B1 * | 12/2004 | Brambilla ......... | H01M 8/04007 429/209 |
| 2004/0001986 A1 | 1/2004 | Yazici et al. | |
| 2004/0009386 A1 * | 1/2004 | Nygren et al. .................. | 429/38 |
| 2004/0157112 A1 * | 8/2004 | Suzuki ................ | H01M 4/8605 429/480 |
| 2004/0253504 A1 | 12/2004 | Mossman et al. | |
| 2007/0111078 A1 | 5/2007 | Tanno | |
| 2009/0029222 A1 * | 1/2009 | Bae et al. ........................ | 429/30 |
| 2010/0196779 A1 | 8/2010 | Koyama et al. | |

FOREIGN PATENT DOCUMENTS

| | | | |
|---|---|---|---|
| JP | | 5-242894 | 9/1993 |
| JP | | 8-507402 | 8/1996 |
| JP | | 2000-067876 | 3/2000 |
| JP | | 2001057215 A * | 2/2001 |
| JP | | 2002-100372 | 4/2002 |
| JP | | 2005-294121 | 10/2005 |
| JP | | 2006-278294 | 10/2006 |
| JP | | 2006-339089 | 12/2006 |
| JP | | 2007103241 A * | 4/2007 |
| JP | | 2009-032692 | 2/2009 |
| WO | | 2004/109833 | 12/2004 |

OTHER PUBLICATIONS

Preliminary Report on Patentability dated Mar. 15, 2012 in International (PCT) Application No. PCT/JP2010/005348, together with English translation thereof.
Supplementary European Search Report (ESR) dated Mar. 3, 2014 in corresponding European Patent Application No. EP 10 81 3490.
Office Action dated Sep. 10, 2015, in corresponding European Application No. 10 813 490.9.

* cited by examiner

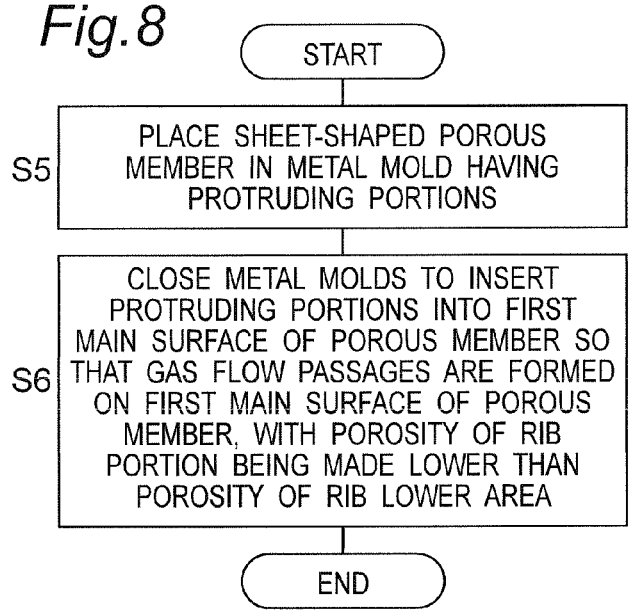
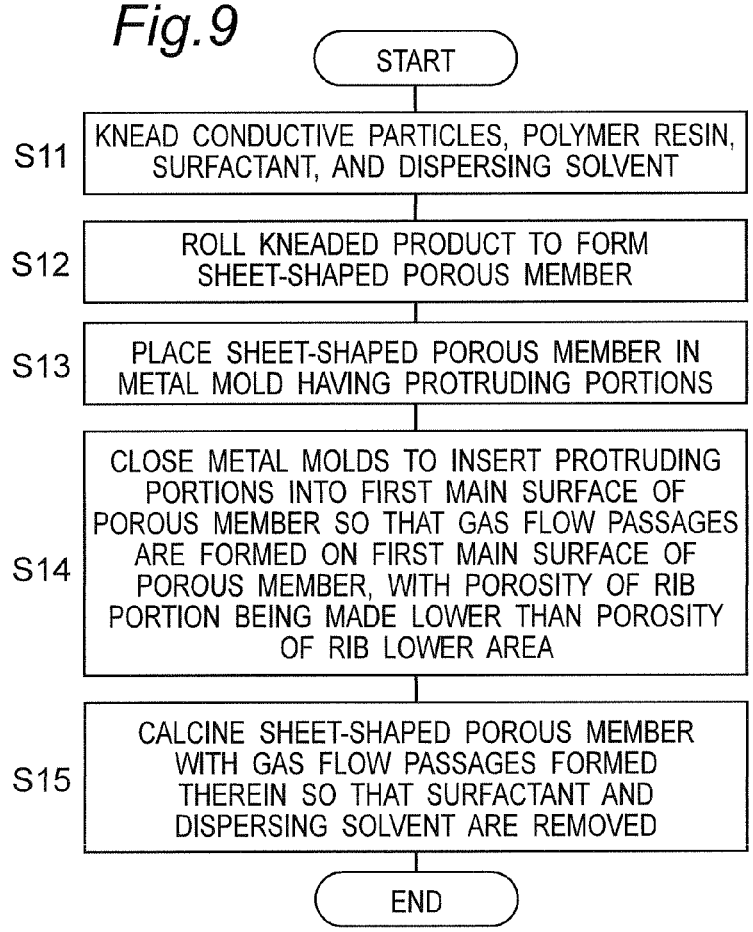

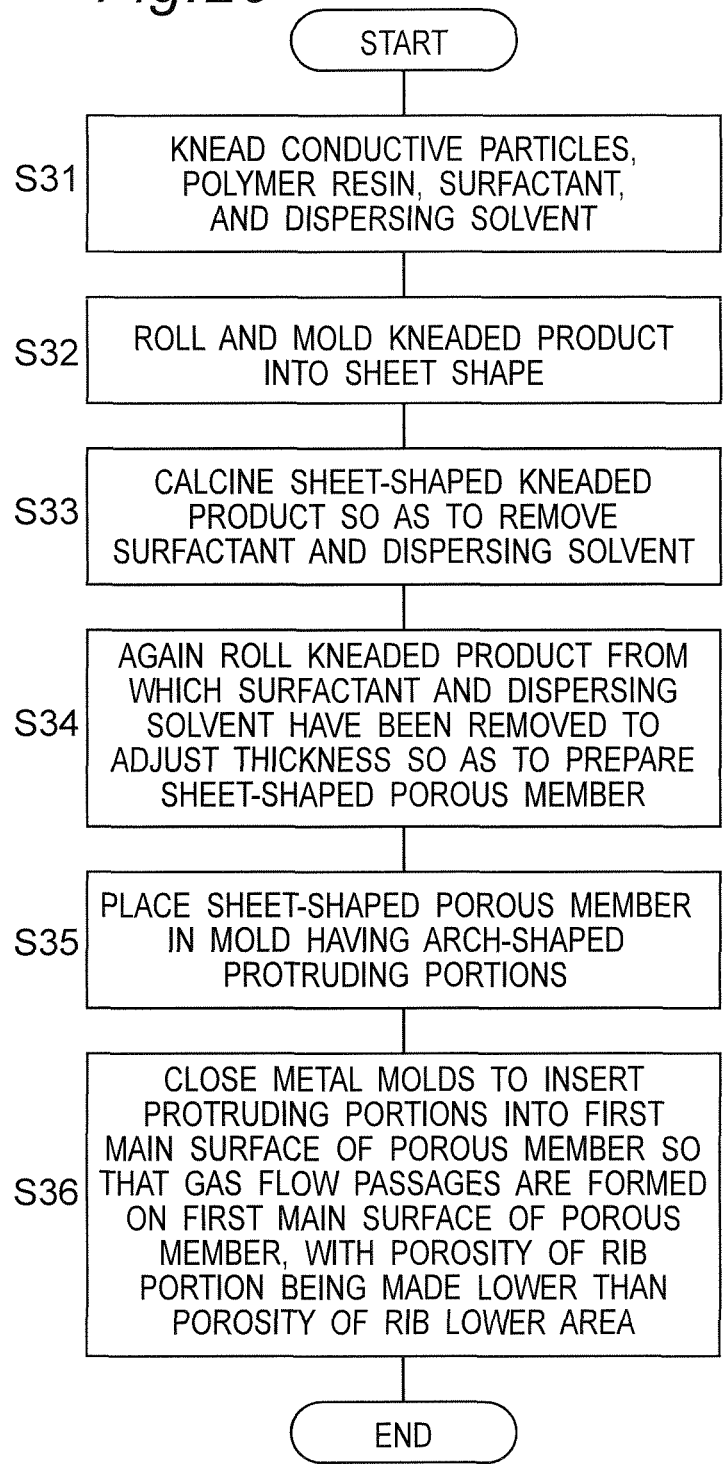

MEMBRANE ELECTRODE ASSEMBLY WITH GAS DIFFUSION LAYERS HAVING A RIB POROSITY AND METHOD OF MANUFACTURING THE SAME, AS WELL AS FUEL CELL

TECHNICAL FIELD

The present invention relates to a fuel cell that uses pure hydrogen, a liquid fuel such as methanol, or a reducing agent such as reformed hydrogen derived from fossil fuel or the like, as a fuel gas, and also uses air (oxygen) or the like as an oxidant gas, and more specifically to a membrane electrode assembly installed in the fuel cell, and a method of manufacturing such an assembly.

BACKGROUND ART

A fuel cell, for example, a polymer electrolyte fuel cell, is an apparatus in which a fuel gas containing hydrogen and an oxidant gas containing oxygen, such as air, are electrochemically reacted with each other in a gas diffusion layer having a catalyst layer made of platinum or the like so as to simultaneously generate power and heat.

FIG. 30 is a cross-sectional view that schematically shows a basic structure of a conventional polymer electrolyte fuel cell. A single cell (referred to also as a "cell") 100 of the polymer electrolyte fuel cell is provided with a membrane electrode assembly 110 (hereinafter, referred to also as an MEA: Membrane-Electrode-Assembly) and a pair of plate-shaped conductive separators 120 and 120 that are disposed on two surfaces of the MEA 110.

The MEA 110 is provided with a polymer electrolyte membrane (ion exchange resin membrane) 111 that selectively transports hydrogen ions, and a pair of electrode layers 112 formed on the two surfaces of the polymer electrolyte membrane 111. The pair of electrode layers 112 are formed on the two surfaces of the polymer electrolyte membrane 111, and each of these has a catalyst layer 113 mainly comprised of carbon powder on which a platinum catalyst has been supported, and a gas diffusion layer 114 (also referred to as a GDL) that is formed on the catalyst layer 113 and compatibly has a current-collecting function, gas permeability, and water repellency. The gas diffusion layer 114 is comprised of a base material 115 made from carbon fibers, and a coating layer (water-repellent carbon layer) 116 comprised of carbon and a water repelling member.

On a main surface of each of the pair of separators 120 and 120 that is made in contact with the gas diffusion layer 114, a gas flow passage 121 with a rectangular cross-sectional shape that allows a fuel gas or an oxidant gas serving as a reaction gas to flow therethrough is formed. A gas flow passage 121 formed on one of the separators 120 serves as a fuel gas flow passage used for flowing a fuel gas, and another gas flow passage 121 formed on the other separator is an oxidant gas flow passage used for flowing an oxidant gas. On mutually adjacent surfaces of the pair of separators 120 and 120, a cooling-water passage 122 through which cooling water or the like is allowed to pass is formed. A fuel gas is supplied to one of the electrode layers 112 through the one of the gas flow passages 121, and an oxidant gas is supplied to the other electrode layer 112 through the other gas flow passage 121 so that an electrochemical reaction occurs to generate power and heat.

As shown in FIG. 30, two or more of the cells 100 constructed as described above are generally stacked and used, with the adjacent cells 100 being electrically connected in series with each other. At this time, the mutually stacked cells 100 are pressurized and fastened with each other under a predetermined fastening pressure applied by fastening members 130 such as bolts, so as to prevent a reaction gas from leaking, and also to reduce contact resistance. Therefore, the MEA 110 and the separator 120 are made in face-to-face contact with each other by a predetermined pressure. At this time, the separator 120 exerts a current-collecting function so as to electrically connect the mutually adjacent MEAs 110 and 110 in series with each other. Moreover, in order to prevent a gas required for an electrochemical reaction from externally leaking, a sealing member (gasket) 117 is disposed between the pair of separators 120 and 120 so as to cover the side faces of the catalyst layer 113 and the gas diffusion layer 114.

In recent years, in the field of fuel cells, there have been strong demands for lower costs, and from the viewpoints of reduction of unit costs of the respective components and reduction of the number of parts, various techniques for cutting costs have been proposed. One of these techniques includes a technique in which gas flow passages 121 are formed not in the separator 120, but in the gas diffusion layer 114.

In the conventional fuel cell shown in FIG. 30, gas flow passages 121 are formed in the separator 120. As a method for achieving this structure, an injection molding method is proposed in which, for example, carbon and a resin are used as materials for the separator 120, and by using a metal mold having convex portions, each having a rectangular cross-sectional shape corresponding to the shape of the gas flow passage 121, these materials are injection-molded. However, this method has an issue of high production costs. Moreover, as another method for achieving the above-mentioned structure, metal is used as a material for the separator 120, and by using a metal mold having concave portions each having a rectangular cross-sectional shape corresponding to the shape of the gas flow passage 121, the metal is rolled. However, although this method achieves lower costs in comparison with the injection molding method, the separator 120 is easily corroded, resulting in an issue in that power generation performances as the fuel cell are lowered.

In order to provide a gas diffusing property, the gas diffusion layer 114 is comprised of a porous material. For this reason, it is easier to form a gas flow passage 121 in the gas diffusion layer 114 than to form the gas flow passage in a separator, and this arrangement is more advantageous in reducing costs and achieving high power generation performances. The gas diffusion layer having such a structure is, for example, proposed by Patent Document 1 (JP-A No. 2006-339089).

Patent Document 1 discloses a technique in which a porous member made from carbon fibers as a base material is molded by a molding jig provided with a plurality of passage molds that are extended into a rectangular parallelepiped shape, by using a paper making method, and after the molding process, by drawing out the molding jig, a gas flow passage is formed inside the gas diffusion layer.

PRIOR ART DOCUMENT

Patent Document

Patent Document 1: JP-A No. 2006-339089

SUMMARY OF THE INVENTION

Subject to be Solved by the Invention

In the fuel cell, further improvements of power generation performances are demanded, and the conventional structure have an issue in that the power generation performances are not sufficient.

Therefore, an object of the present invention is to improve the issue described above, and to provide a membrane electrode assembly capable of further improving the power generation performances and a manufacturing method thereof, as well as a fuel cell provided with such a membrane electrode assembly.

Means for Solving the Problem

In order to achieve the above object, the present invention is provided with the following arrangements.

The present invention provides a membrane electrode assembly that is provided with:

a polymer electrolyte membrane;

a pair of catalyst layers formed so as to sandwich the polymer electrolyte membrane; and paired gas diffusion layers that are formed so as to sandwich the pair of catalyst layers and the polymer electrolyte membrane, with at least one of the layers being comprised of a porous member mainly comprised of conductive particles and a polymer resin, and provided with a first main surface made in contact with the catalyst layers and a second main surface positioned on the side opposite to the first main surface, with a plurality of gas flow passages being formed on the second main surface so as to be adjacent to one after another, so that a rib portion that separates the mutually adjacent gas flow passages from each other has a porosity that is lower than a porosity of a lower area of the rib portion positioned on the first main surface side.

Effect of the Invention

According to the membrane electrode assembly of the present invention, since the porosity of the rib portion that separates mutually adjacent gas flow passages from each other is made lower than the porosity of a lower area of the rib portion, it is possible to suppress the deformation of the rib portion and excessive permeation of the reaction gas, and consequently to further improve power generation performances of a fuel cell.

BRIEF DESCRIPTION OF THE DRAWINGS

These and other objects and features of the present invention will become clear from the following description taken in conjunction with the preferred embodiments thereof with reference to the accompanying drawings, in which:

FIG. 8 is a flow chart that shows another producing method different from the producing method shown in FIG. 3;

FIG. 9 is a flow chart that shows still another producing method different from the producing methods shown in FIGS. 3 and 8;

FIG. 20 is a flow chart that shows one example of a method of producing the gas diffusion layer shown in FIG. 16;

DETAILED DESCRIPTION OF THE INVENTION

Figure 1:
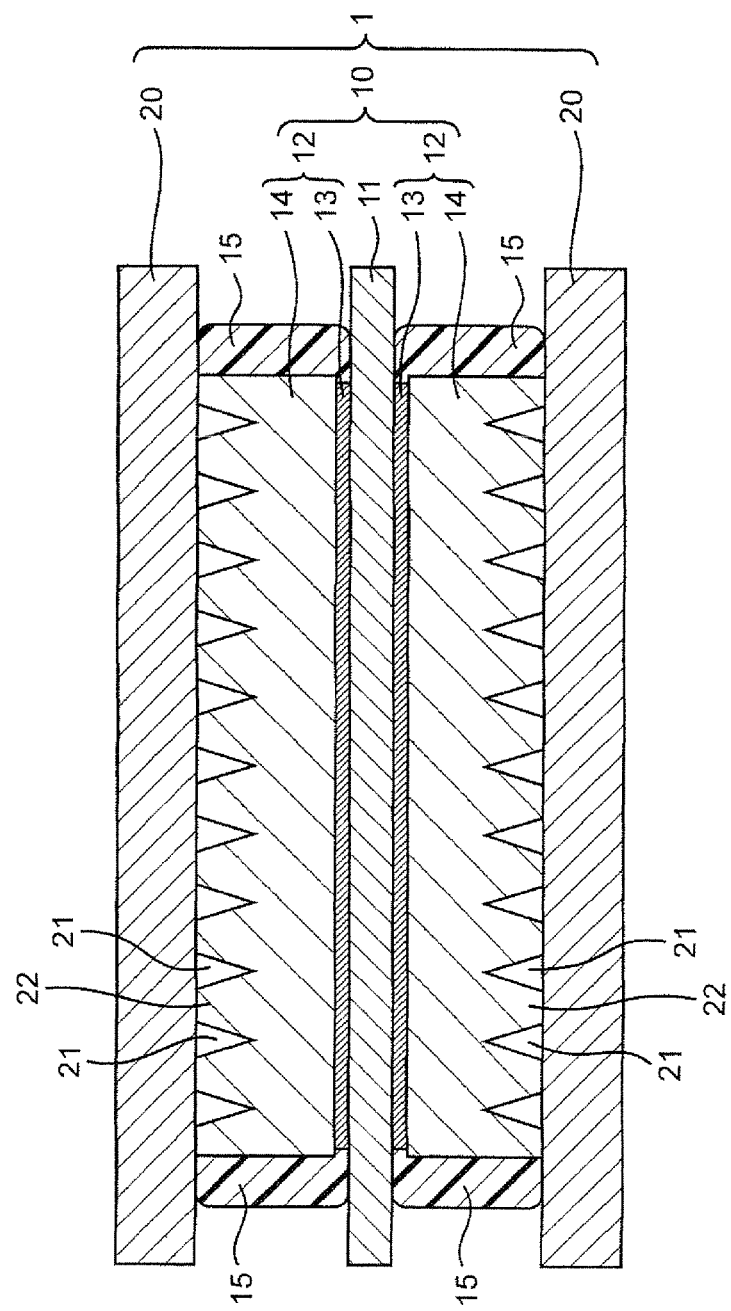
FIG. 1 is a cross-sectional view that schematically shows a basic structure of a fuel cell according to a first embodiment of the present invention.

As a result of a dedicated examination made by the present inventors on the reason why conventional fuel cells fail to obtain sufficient power generation performances, the present inventors have obtained the following findings.

When gas flow passages are formed on a gas diffusion layer, each rib portion that separates the mutually adjacent gas flow passages from each other is also inevitably formed by the porous member. In the case where, as in Patent Document 1, the gas diffusion layer is formed by using a porous member made from carbon fibers as a base material, porosity of the gas diffusion layer normally becomes as high as 80% or more. The present inventors have found that, because of this, a reaction gas permeates (makes a short-cut of) the inside of the rib portion, with the result that the reaction gas does not flow along the shape of the gas flow passage to cause a failure in providing sufficient power generation performances. Moreover, the present inventors have also found that, since the rib portion is made from the porous member, the rib portion is deformed by a fastening pressure to be applied upon assembling the cells to cause the cross-sectional area of the gas flow passage to become extremely small. When the cross-sectional area of the gas flow passage becomes small, the reaction gas is not supplied to the electrode layer sufficiently to cause a reduction in power generation performances.

The above-mentioned issue is considered to be improved by making the porosity of the gas diffusion layer lower (making the density higher). However, in the case where the porosity of the gas diffusion layer is lowered, since the gas diffusing characteristic declines, the power generation performances of the fuel cell might become low as the result. To make the porosity of the gas diffusion layer lower (80% or less) is easily achieved by forming the gas diffusion layer without using carbon fibers as the base material. However, a gas diffusion layer formed without using carbon fibers as the base material (hereinafter, referred to as a "base-material-less gas diffusion layer") has an issue that it is weak in strength. For this reason, the rib portion tends to be more easily deformed by the fastening pressure to be applied upon assembling the cells.

In view of these issues, the present inventors have found that the power generation performances can be improved not by lowering the porosity of the entire gas diffusion layer, but by making the porosity partially different in a single gas diffusion layer. More specifically, the present inventors have found that, while, by making the porosity of the rib portion lower, the deformation of the rib portion and excessive permeation of the reaction gas are prevented, the gas diffusing characteristic can be ensured by making the porosity of the lower area of the rib portion higher than the porosity of the rib portion, thereby making it possible to improve the power generation performances as the result.

Based upon these findings, the present inventors have achieved the present invention.

According to a first aspect of the present invention, there is provided a membrane electrode assembly comprising:
a polymer electrolyte membrane;
a pair of catalyst layers formed so as to sandwich the polymer electrolyte membrane; and
paired gas diffusion layers that are formed so as to sandwich the pair of catalyst layers and the polymer electrolyte membrane, with at least one of the layers being comprised of a porous member mainly comprised of conductive particles and a polymer resin, and provided with a first main surface made in contact with the catalyst layers and a second main surface positioned on a side opposite to the first main surface, with a plurality of gas flow passages being formed on a second main surface side so as to be adjacent to one after another, so that a rib portion that separates the mutually adjacent gas flow passages from each other has a porosity that is lower than a porosity of a lower area of the rib portion positioned on a first main surface side.

According to a second aspect of the present invention, there is provided the membrane electrode assembly according to the first aspect, wherein the porosity of the rib portion is lower than the porosity of the lower area of the gas flow passage positioned on the second surface side.

According to a third aspect of the present invention, there is provided the membrane electrode assembly according to the first or second aspect, wherein at least one portion of the gas flow passage has a cross-sectional shape that allows a passage width to become larger from a bottom portion located on the second main surface side toward an upper portion located on the first main surface side.

According to a fourth aspect of the present invention, there is provided the membrane electrode assembly according to the third aspect, wherein the gas flow passage located on a center side of the first main surface of the gas diffusion layer has a rectangular cross-sectional shape, while the gas flow passage located on a peripheral side of the first main surface of the gas diffusion layer has a cross-sectional shape that allows a passage width to become larger from the bottom portion toward the upper portion.

According to a fifth aspect of the present invention, there is provided the membrane electrode assembly according to the third aspect, wherein all the gas flow passages have a cross-sectional shape that allows a passage width to become larger from the bottom portion toward the upper portion.

According to a sixth aspect of the present invention, there is provided the membrane electrode assembly according to any one of the third to fifth aspects, wherein the cross-sectional shape that allows the passage width to become larger from the bottom portion toward the upper portion is a triangle.

According to a seventh aspect of the present invention, there is provided the membrane electrode assembly according to any one of the third to fifth aspect, wherein the cross-sectional shape that allows the passage width to become larger from the bottom portion toward the upper portion is an arch shape.

According to an eighth aspect of the present invention, there is provided the membrane electrode assembly according to any one of the third to fifth aspects, wherein the cross-sectional shape that allows the passage width to become larger from the bottom portion toward the upper portion is a trapezoidal shape.

According to a ninth aspect of the present invention, there is provided a fuel cell comprising:

the membrane electrode assembly disclosed in any one of the first to eighth aspects; and a pair of separators that are placed so as to sandwich the membrane electrode assembly, with a surface on a side to be made in contact with the membrane electrode assembly being formed into a flat shape.

According to a tenth aspect of the present invention, there is provided a fuel cell comprising:

the membrane electrode assembly disclosed in any one of the first to eighth aspects;

a first separator that is paced on the second main surface side of the gas diffusion layer, with a surface on a side to be made in contact with the membrane electrode assembly being formed into a flat shape; and a second separator that is placed to be paired with the first separator so as to sandwich the membrane electrode assembly, with one of main surfaces to be made in contact with the membrane electrode assembly being provided with a groove-shaped gas flow passage formed thereon.

According to an 11th aspect of the present invention, there is provided a method of manufacturing a membrane electrode assembly, which manufactures a membrane electrode assembly in which gas flow passages are formed on a first main surface of the membrane electrode assembly, comprising:

after a sheet-shaped porous member mainly comprised of conductive particles and a polymer resin has been placed in a metal mold in which protruding portions with a shape narrowed toward a tip are formed, closing the metal mold so that the protruding portions are inserted into a first main surface of the porous member to form the gas flow passages, with a rib portion that separates the adjacent gas flow passages from each other being allowed to have a porosity that is lower than a porosity of a lower area of the rib portion that is positioned on a second main surface side of the porous member.

According to a 12th aspect of the present invention, there is provided the method of manufacturing a membrane electrode assembly according to the 11th aspect, wherein each of the protruding portions has a cross section formed into a triangle.

According to a 13th aspect of the present invention, there is provided the method of manufacturing a membrane electrode assembly according to the 11th aspect, wherein each of the protruding portions has a cross section formed into an arch shape.

According to a 14th aspect of the present invention, there is provided the method of manufacturing a membrane electrode assembly according to the 11th aspect, wherein each of the protruding portions has a cross section formed into a trapezoidal shape.

According to a 15th aspect of the present invention, there is provided a method of manufacturing a membrane electrode assembly, which manufactures a membrane electrode assembly in which gas flow passages are formed on a first main surface of the membrane electrode assembly, comprising:

after a sheet-shaped porous member mainly comprised of conductive particles and a polymer resin has been placed in a metal mold having protruding portions, closing the metal mold so that the protruding portions are inserted into a first main surface of the porous member; and moving the inserted protruding portions in plane directions of the porous member so that the gas flow passages are formed on the first main surface of the porous member, with a rib portion that separates the adjacent gas flow passages from each other being allowed to have a porosity that is lower than a porosity of a lower area of the rib portion that is positioned on a second main surface side of the porous member.

According to a 16th aspect of the present invention, there is provided the method of manufacturing a membrane electrode assembly according to the 15th aspect, wherein each of the protruding portions has a first protrusion and a second protrusion, and the gas flow passage is formed by moving the first protrusion and the second protrusion in mutually departing directions.

Embodiments of the present invention will be described below with reference to the drawings. In all the drawings, the same reference numerals are used to designate the same or corresponding parts, and the overlapping description thereof will be omitted.

First Embodiment

Referring to FIG. 1, a description will be given of a basic structure of a fuel cell according to a first embodiment of the present invention. FIG. 1 is a cross-sectional view that schematically shows the basic structure of the fuel cell according to the first embodiment. The fuel cell of the first embodiment is a polymer electrolyte fuel cell that simultaneously generates power and heat by allowing a fuel gas containing hydrogen and an oxidant gas containing oxygen such as air to electrochemically react with each other. The present invention is not intended to be limited only to the polymer electrolyte fuel cell, and is applicable to various kinds of fuel cells.

As shown in FIG. 1, a fuel cell according to the first embodiment is provided with a cell 1 having a membrane electrode assembly 10 (hereinafter, referred to as an "MEA") and a pair of plate-shaped conductive separators 20 and 20 that are disposed on the two surfaces of the MEA 10. Additionally, the fuel cell according to the first embodiment may be formed by stacking the plurality of cells 1. In this case, in order to prevent a fuel gas and an oxidant gas from leaking and also to reduce contact resistance, the mutually stacked cells 1 are preferably pressurized and fastened to one after another by a predetermined fastening pressure applied by fastening members (not shown) such as bolts.

The MEA 10 is provided with a polymer electrolyte membrane 11 that selectively transports hydrogen ions, and a pair of electrode layers 12 and 12 formed on the two surfaces of the polymer electrolyte membrane 11. One of the pair of electrodes 12 is an anode electrode, and the other electrode is a cathode electrode. Each of the pair of electrode layers 12 and 12 that are formed on the two surfaces of the polymer electrolyte membrane 11 has a catalyst layer 13 mainly comprised of carbon powder that bears a platinum catalyst, and a gas diffusion layer 14 that is formed on the catalyst layer 13, and compatibly exerts a current-collecting function, gas permeability, and water repellency.

On a main surface of the gas diffusion layer 14 that is made in contact with the separator 20, gas flow passages 21 that allow a reaction gas to flow therethrough are formed. The gas flow passages 21 on the anode electrode side are fuel-gas flow passages through which a fuel gas flows, and the gas flow passages 21 on the cathode electrode side are oxidant gas flow passages through which an oxidant gas flows. The fuel gas is supplied to the anode electrode through the fuel-gas flow passages, and the oxidant gas is supplied to the cathode electrode through the oxidant gas flow passages so that an electrochemical reaction occurs to generate power and heat. The tip of each of rib portions 22 that separates the adjacent gas flow passages 21 and 21 from each other is made in contact with the separator 20 with a predetermined pressure (for example, 2 kgf/cm$^2$). Thus, the reaction gas is prevented from flowing outside of the gas flow passage 21 (external leakage).

The separator 20 is made of a material such as metal having a low gas permeability. A cooling water passage (not shown) through which cooling water or the like flows may be installed on the separator 20. In order to prevent the reaction gas from externally leaking, gaskets 15 serving as sealing members are installed between the separator 20 and the polymer electrolyte membrane 11 so as to cover the side faces of the catalyst layer 13 and the gas diffusion layer 14.

Additionally, the gaskets 15 may be disposed between the pair of separators 20 and 20 so as to cover the side faces of the polymer electrolyte membrane 11, the catalyst layer 13, and the gas diffusion layer 14. Thus, the deterioration of the polymer electrolyte membrane 11 is suppressed, so that the handling characteristic and workability at the time of mass production of the MEA 10 can be improved. Moreover, it is preferable to allow one portion of each gasket 15 to be impregnated with the gas diffusion layer 14, from the viewpoints of power generation durability and strength.

As the material for the gaskets 15, generally-used thermoplastic resins, thermosetting resins and the like can be used. Specific examples of the material for the gaskets 15 include: silicon resin, epoxy resin, melamine resin, polyurethane resin, polyimide resin, acrylic resin, ABS resin, polypropylene, liquid crystalline polymer, polyphenylene sulfide resin, polyslufone, and glass fiber reinforced resin.

Figure 2:
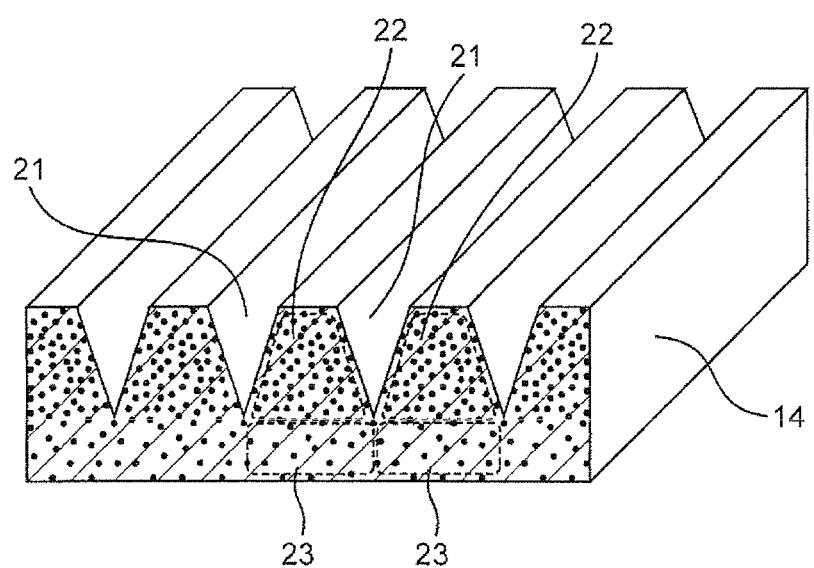
FIG. 2 is an enlarged perspective view that shows a gas diffusion layer provided in the fuel cell shown in FIG. 1.

Referring to FIG. 2, a description will now be given in more detail of the structure of the gas diffusion layer 14 according to the first embodiment of the present invention. FIG. 2 is an enlarged perspective view of the gas diffusion layer 14. In FIG. 2, a plurality of black dots are used to indicate differences in porosity (density) for the sake of convenience of explanation.

The gas diffusion layer 14 is comprised of a base-material-less gas diffusion layer formed without using carbon fibers as the base material. More specifically, the gas diffusion layer 14 is formed by a rubber-state porous member having a sheet shape, mainly comprised of conductive particles and a polymer resin. In this case, "the porous member mainly comprised of conductive particles and a polymer resin" refers to a porous member having a structure (so-called self-supporting structure) that is supported by the conductive particles and the polymer resin, without using carbon fibers as the base material. In the case where the porous member is formed by using the conductive particles and polymer resin, for example, a surfactant and a dispersing solvent to be described below are used. In this case, during production processes, the surfactant and the dispersing solvent are removed by calcining; however, some of them might remain in the porous member without being sufficiently removed. Therefore, as long as the self-supporting structure without using carbon fibers as the base material is concerned, it means that such residual surfactant and dispersing solvent may be contained in the porous member. Moreover, the self-supporting structure without using carbon fibers as the base material also means that other materials (for example, carbon fibers with short fibers, or the like) may be contained in the porous member.

Moreover, the gas diffusion layer 14 is formed so that the porosity of each of rib portions 22 that separates the mutually adjacent gas flow passages 21 and 21 from each other is lower than the porosity of a lower area (hereinafter, referred to as a "rib lower area") 23 of the rib portion 22. In other words, the gas diffusion layer 14 is formed so that the density of the rib portion 22 is made "dense", with the density of the rib lower area 23 being made "thin". For example, the porosity of the entire gas diffusion layer 14 except for the rib portion 22 is set to 70%, while the porosity of the rib portion 22 is set to 40% to 50%. In this case, the "rib lower area" refers to an area located vertically below the rib portion 22. Moreover, in this case, for the sake of convenience of explanation, directions are defined as "upward" toward the separator 20 side, and as "downward" toward the catalyst layer 13 side; however, the present invention is not intended to be limited by these.

As the material for the conductive particles forming the gas diffusion layer 14, for example, carbon materials, such as graphite, carbon black, and active carbon, may be used. As the carbon black, acetylene black (AB), Furnace Black, Ketchen Black, Vulcan, and the like may be proposed. Among these, acetylene black is preferably used as a main component of carbon black, from the viewpoints of little content of impurities and high electric conductivity.

Moreover, the conductive particles are preferably prepared by mixing two kinds of carbon materials having mutually different average particles sizes. Thus, since those particles having a smaller average particle size are allowed to enter gaps among those particles having a larger average particle size, it becomes possible to make the porosity of the entire gas diffusion layer 14 lower (for example, 60% or less). As conductive particles that are easily formed into a filled structure, graphite particles are proposed. Therefore, the conductive particles are preferably prepared by mixing acetylene black and graphite.

Additionally, when the average particle size $D_{50}$ of acetylene black (referred to also as a median diameter: particle size at the time of 50% in the relative amount of particles) was measured by using a Microtrack HRA (laser diffraction type particle-size measuring apparatus), $D_{50}$ of 5 μm was obtained. Moreover, when the particle size $D_{50}$ of graphite was measured in the same manner as in acetylene black, $D_{50}$ of 16 μm was obtained. These measurements of the average particle sizes were carried out in a state in which, after particles of acetylene black or graphite had been dispersed in distilled water containing 10 wt % of a surfactant, the particle size distribution was stabilized.

Additionally, in the case where the conductive particles are formed by mixing three or more kinds of carbon materials, it becomes difficult to optimize dispersion, kneading, and rolling conditions, or the like. For this reason, the conductive particles are preferably formed by mixing two kinds of carbon materials.

Moreover, for example, powder state, fiber state, particle state, and the like are proposed as material modes of the carbon material. Among these, the powder state is desirably adopted as the material mode of the carbon material, from the viewpoints of dispersing characteristic and handling characteristic.

The polymer resin forming the gas diffusion layer 14 has a function as a binder for mutually binding the conductive particles with one after another. Moreover, since the polymer resin has water repellency, it also exerts a function (water holding property) for confining water into a system inside the fuel cell.

As the material for the polymer resin, examples thereof include: PTFE (polytetrafluoroethylene), FEP (tetrafluoroethylene-hexafluoropropylene copolymer), PVDF (polyvinylidene fluoride), ETFE (tetrafluoroethylene-ethylene copolymer), PCTFE (polychlorotrifluoroethylene), PFA (tetrafluoroethylene-perfluoroalkylvinylether copolymer), and the like. Among these, PTFE is preferably used as the material for the polymer resin, from the viewpoints of heat resistance, water repellency, and chemical resistance. For example, dispersed state, powder state, and the like are proposed as material modes of PTFE. Among these, the dispersed state is desirably adopted as the material mode of PTFE, from the viewpoint of workability.

The porosity of the rib portion 22 is preferably set in a range of 20% or more to less than 50%. In the case where the porosity of the rib portion 22 is less than 20%, the gas diffusing property of the rib portion 22 is lowered, with the result that the reaction gas no longer reaches the rib lower area 23, in particular, to cause degradation in power generation performances. In contrast, in the case where the porosity of the rib portion 22 is 50% or more, the strength of the rib portion 22 is lowered, with the result that the rib portion 22 is easily deformed. Moreover, in this case, the amount of the reaction gas permeating through the inside of the rib portion 22 becomes too much, with the result that the amount of a gas flowing through the gas flow passage 21 is reduced, making it difficult to distribute the reaction gas uniformly over the entire in-plane area of the electrode (in particular, in the downstream area).

The porosity of the rib lower area 23 is preferably set to 65% or more to less than 80%. In the case where the porosity of the rib lower area 23 is less than 65%, the gas permeability is lowered, with the result that the reaction gas is hardly allowed to flow in the width direction of the gas diffusion layer 14, making it difficult to generate power vertically below the rib portion 22. In contrast, it is difficult from the viewpoint of production processes to make the porosity of the gas diffusion layer 80% or more, without using carbon fibers as the base material. Even if a gas diffusion layer having a porosity of 80% or more could be produced, the strength would be seriously lowered, failing to exert functions (in particular, durability) as the gas diffusion layer.

Although the width of the gas flow passage 21 is varied greatly in optimal value depending on the electrode area, gas flow rate, electric current density, moistening conditions, cell temperature, and the like, it is preferably set in a range of 0.1 mm to 3.0 mm, in particular, in a range of 0.2 mm to 1.5 mm, in a portion with the widest passage width. In the case where the width of the gas flow passage 21 is less than 0.1 mm, the width of the gas flow passage 21 might not be sufficient relative to the amount of the reaction gas that is normally allowed to flow through a fuel cell. In contrast, in the case where the width of the gas flow passage 21 is larger than 3.0 mm, the reaction gas is not allowed to flow through the entire gas flow passage 21, resulting in untransported reaction gas and the subsequent flooding of the reaction gas.

Although it depends largely on the electrode area, gas flow rate, electric current density, moistening conditions, cell temperature, and the like, the depth of the gas flow passage 21 is preferably set in a range of 0.015 mm to 2.0 mm, in particular, in a range of 0.03 mm to 0.8 mm. In the case where the depth of the gas flow passage 21 is less than 0.015 mm, the depth of the gas flow passage 21 might not be sufficient relative to the amount of the reaction gas that is normally allowed to flow through a fuel cell. In contrast, in the case where the depth of the gas flow passage 21 is larger than 2.0 mm, the reaction gas is not allowed to flow through the entire gas flow passage 21, resulting in untransported reaction gas and the subsequent flooding of the reaction gas.

The width of the rib portion 22 is preferably set in a range of from 0.1 mm to 3.0 mm, in particular, in a range of 0.2 mm to 2.0 mm, in the thinnest portion. In the case where the width of the rib portion 22 is less than 0.1 mm, the strength of the rib portion 22 is lowered, with the result that the rib portion 22 is easily deformed. In contrast, in the case where the width of the rib portion 22 is greater than 3.0 mm, the area located vertically below the rib portion 22 becomes large, and therefore the reaction gas is not diffused uniformly within the first diffusion layer, with the result that deviations might be caused in the in-plane power generation distribution.

Although the thickness of the rib lower area 23 is greatly different in optimal value depending on the gas utilization factor, electric current density, moistening conditions, cell temperature, and the like, it is preferably set in a range of 0.05 mm to 1.0 mm, in particular, in a range of 0.1 mm to 0.6 mm.

As shown in FIG. 1, the gas flow passage 21 formed in the gas diffusion layer 14 has a triangular shape in cross-sectional shape. Not particularly limited, the plane shape (pattern) of the gas flow passage 21 to be formed in the gas diffusion layer 14 can be formed into a shape similar to the shape of the gas flow passage formed in a conventional separator. As the plane shape of such a gas flow passage, for example, a straight shape, a serpentine shape, or the like is proposed.

Additionally, as the gas diffusion layer 14, any structure may be used as long as it has a structure (so-called self-supporting structure) supported by conductive particles and a polymer resin, without using carbon fibers as base material. Therefore, the gas diffusion layer 14 may contain trace amounts of a surfactant and a dispersing solvent to be used upon producing the gas diffusion layer 14, in addition to the conductive particles and the polymer resin. As the dispersing solvent, examples thereof include: water, alcohols, such as methanol and ethanol, and glycols such as ethylene glycol. As the surfactant, examples thereof include: nonionic materials, such as polyoxyethylene alkyl ether, and amphoteric ion materials such as alkyl amine oxide. The amount of the dispersing solvent and the amount of the surfactant to be used upon production can be set on demand depending on the kinds of the conductive particles, the kinds of the polymer resin, and the compounding ratio thereof. In general, as the amount of the dispersing solvent and the amount of the surfactant become higher, the conductive particles and the polymer resin tend to be easily dispersed uniformly, while the flowability tends to become higher, resulting in a difficulty in forming the gas diffusion layer into a sheet shape.

Moreover, the gas diffusion layer 14 may contain carbon fibers at a weight that is too small to form a base material (for example, weight that is smaller than the weight of the conductive particles and polymer resin). Since the carbon fibers have a reinforcing effect, a gas diffusion layer having high strength can be produced by increasing the compounding ratio of carbon fibers.

As the material for the carbon fibers, for example, vapor grown carbon fibers (hereinafter, referred to as VGCFs), milled fibers, cut fibers, chopped fibers, etc. may be used. In the case of using the VGCFs as the carbon fibers, for example, those having a fiber diameter of 0.15 μm and a fiber length of 15 μm may be used. Moreover, in the case of using the milled fibers, cut fibers, or chopped fibers as the carbon fibers, those having a fiber diameter of 5 to 20 μm and a fiber length of 20 μm to 100 μm may be used.

As the material for the milled fibers, cut fibers, or chopped fibers, any of PAN-based, pitch-based, and rayon-based fibers may be used. Moreover, the fibers are preferably prepared by dispersing bundles of short fibers that have been obtained by cutting and slicing material fibers (long fibrous filaments or short staple fibers).

The blending quantity of the carbon fibers is preferably set to a weight that is smaller than that of the polymer resin. In order to provide the base-material-less gas diffusion layer with high strength, a sufficient effect can be obtained even by adding a small amount of carbon fibers thereto. In the case where the blending quantity of the carbon fibers is made higher than that of the polymer resin, the carbon fibers tend to stick into a membrane to cause a membrane deterioration and the subsequent degradation in performances. Moreover, this also causes high costs. Moreover, the gas diffusion layer 14 may have a self-supporting structure supported by conductive particles, a polymer resin, and carbon fibers, as long as it does not use carbon fibers as base material.

The compounding ratio of the carbon fibers is preferably set in a range of 2.0% by weight or more to 10.0% by weight or less. In the case where the compounding ratio of the carbon fibers is less than 2.0% by weight, the inner resistance value is abruptly increased, with the result that the power generation efficiency might be lowered. In contrast, in the case where the compounding ratio of the carbon fibers is greater than 10.0% by weight, since the carbon fibers are normally formed by a material that is harder than the polymer electrolyte membrane 11, the polymer electrolyte membrane 11 might be damaged to cause degradation of durability as a fuel cell.

Figure 3:
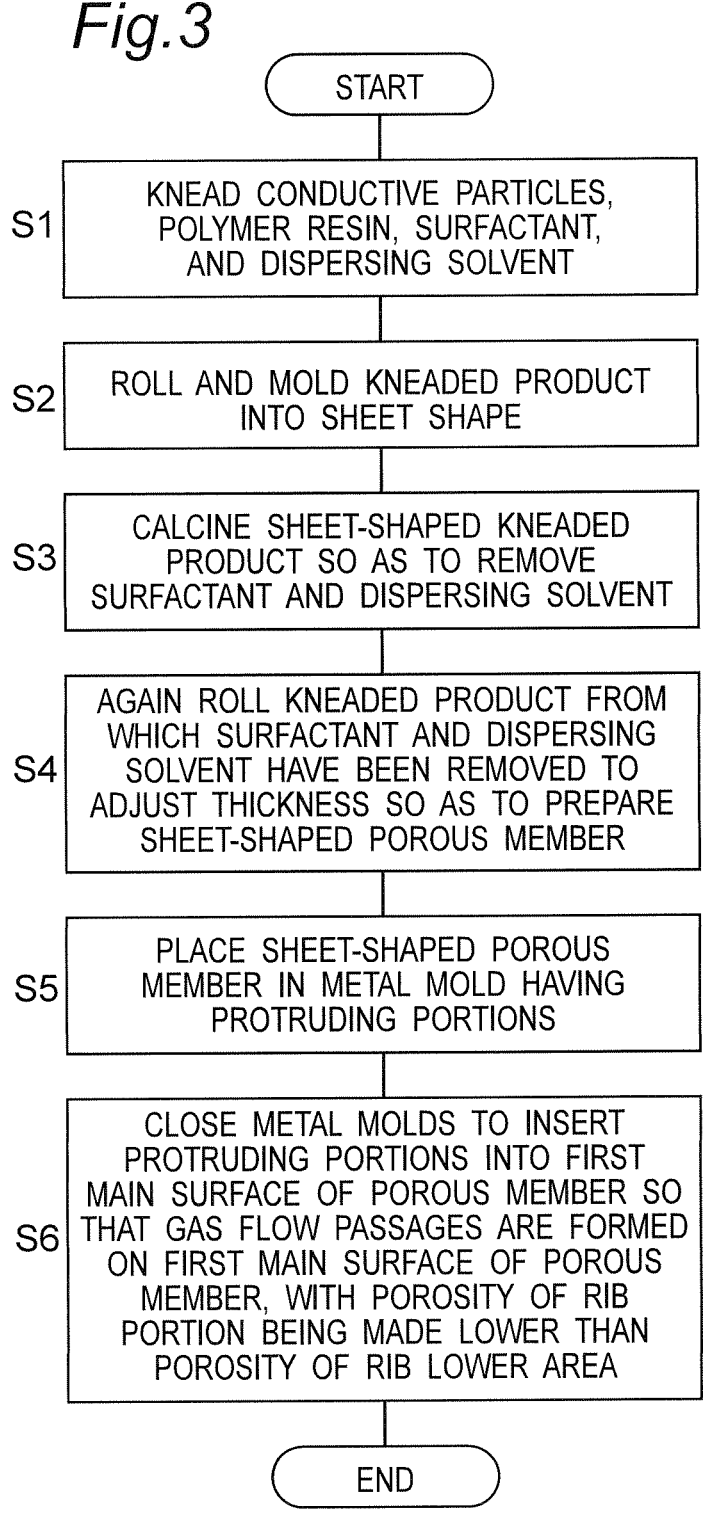
FIG. 3 is a flow chart that shows one example of a method of producing the gas diffusion layer provided in the fuel cell shown in FIG. 1.
Figure 4A:
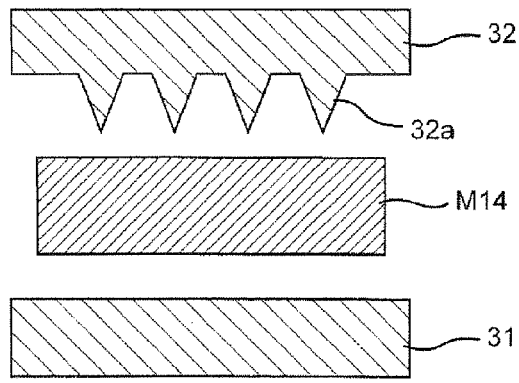
FIG. 4A is an explanatory view that schematically shows one example of the method of producing the gas diffusion layer provided in the fuel cell shown in FIG. 1.
Figure 4B:
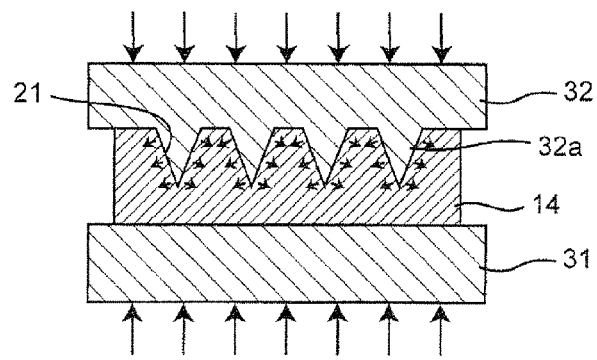
FIG. 4B is an explanatory view that shows processes following those shown in FIG. 4A.

Referring to FIGS. 3, 4A, and 4B, a description will be given of an example of a method of producing the gas diffusion layer 14 according to the first embodiment of the present invention. FIG. 3 is a flow chart that shows one example of the method of producing the gas diffusion layer according to the first embodiment. FIGS. 4A and 4B are explanatory views that schematically show one example of the producing method thereof.

First, in step S1, conductive particles, a polymer resin, a surfactant, and a dispersing solvent are mixed and kneaded. More specifically, the conductive particles, the surfactant, and the dispersing solvent are loaded into a stirring kneader so that those materials are kneaded, pulverized, and granulated. Thereafter, a polymer resin material is added to the kneaded product, and this is further dispersed. Additionally, without loading the polymer resin material into the kneader separately from the other materials, all the materials including the polymer resin material may be loaded into the kneader at the same time.

In step S2, the kneaded product obtained by the kneading process is rolled on a flat-plate pressing machine, and formed into a sheet shape.

In step S3, the kneaded product formed into the sheet shape is calcined so that the surfactant and the dispersing solvent are removed from the kneaded product.

In step S4, the kneaded product from which the surfactant and the dispersing solvent have been removed is again rolled so that thickness is adjusted to produce a sheet-shaped porous member M14. At this time, the porosity of the porous member M14 is uniformly adjusted as a whole (for example, to 70%).

In step S5, as shown in FIG. 4A, the porous member M14 is disposed between a metal mold 32 having protruding portions 32a, each having a triangular shape in cross section that corresponds to a shape of each gas flow passage 21, and a metal mold 31.

In step S6, as shown in FIG. 4B, the metal molds 31 and 32 are closed, and the porous member M14 is rolled. At this time, each of the protruding portions 32a is inserted into the first main surface of the porous member M14 so that each of gas flow passages 21 having a triangular shape in cross section is formed. Moreover, in this case, since the protruding portions 32a, each having a triangular shape in cross section, press the rib portion 22 in compressing direction so that the porosity of the rib portion 22 becomes lower than that of other portions (for example, to 40 to 50%). In other words, the porosity of the rib portion 22 is made lower than the porosity of the rib lower area 23. Thus, a gas diffusion layer 14 as shown in FIG. 2 can be obtained.

Figure 31A:
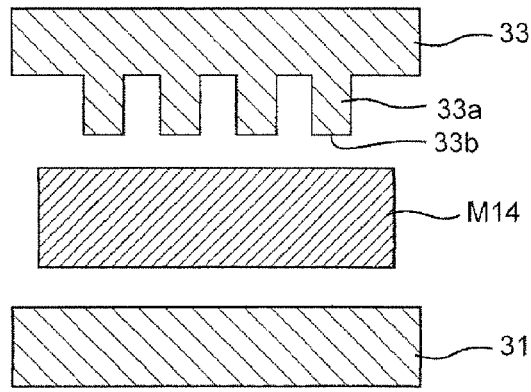
FIG. 31A is an explanatory view that schematically shows a method of producing a gas diffusion layer according to a comparative example.
Figure 31B:
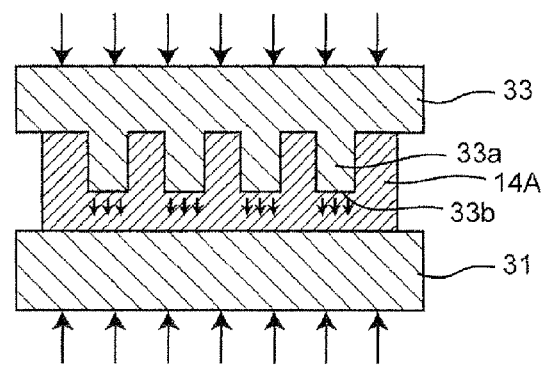
FIG. 31B is an explanatory view that shows processes following those shown in FIG. 31A.
Figure 31C:
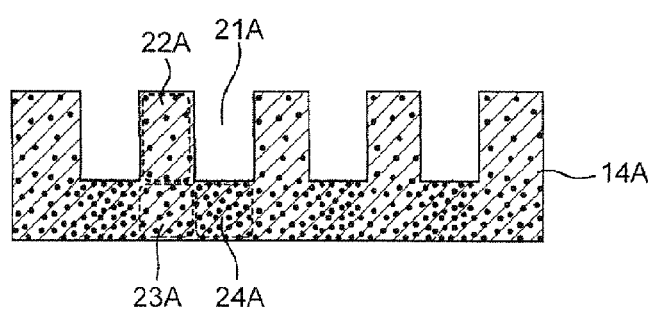
FIG. 31C is an explanatory view that shows processes following those shown in FIG. 31B.

Additionally, as shown in FIGS. 31A and 31B, in the case where a metal mold 33 with protruding portions 33a, each having a rectangular cross-sectional shape, is used in place of the metal mold 32, top faces 33b of the protruding portions 33a are allowed to push the porous member M14 in thickness direction of the porous member M14. In the case of a gas diffusion layer 14A, shown in FIG. 31C, produced in this manner, the porosity of the lower area (hereinafter, referred to as a "passage lower area") 24 of the gas flow passage 21A becomes lower than those of the rib portion 22A and the rib lower area 23A. Moreover, since the rib lower area 23A is adjacent to the passage lower area 24A, its porosity becomes lower than that of the rib portion 22A because of influences of the pressure given by the top faces 33b of the protruding portions 33a. In other words, the porosity of the rib portions 22A becomes higher than the porosity of the rib lower area 23A. In this case, since the porosity of the rib portions 22A is higher, it is not possible to suppress deformations of the rib portions 23A and excessive permeation of the reaction gas, while, since the porosity of the rib lower area 23A and the passage lower area 24A is low, the gas diffusing characteristic is lowered, with the result that the power generation performances are lowered. Additionally, the "passage lower area" refers to an area located at a position vertically below the lower surface of the gas flow passage.

Although the metal molds 31 and 32 may be integrally formed with the rolling machine, it is more preferable to detachably attach these to the rolling machine because of easiness of these in handling. Moreover, as the rolling machine, a roll pressing machine or a flat-plate pressing machine can be used. Of these, the roll pressing machine having high surface precision is more preferably used because thickness deviations of the gas diffusion layer 14 can be reduced. In this case, in the same manner as in a generally-used gravure rolling machine, it is more preferable to directly form a metal mold with protrusions on the surface of the roll.

Moreover, upon rolling and extending processes by the rolling machine, the porous member that is lower in the porosity may be heated on demand. In this case, the heating temperature is preferably set to 250° C. or less. In the case of 250° C. or less in the heating temperature, the porous member that is lower in the porosity softens so that the formation of the gas flow passages 21 can be easily carried out. In contrast, in the case of 250° C. or more in the heating temperature, the porous member that is lower in porosity might deteriorate. Moreover, the rolling force of the rolling machine is preferably set to less than 500 kgf/cm². Although the formation of the gas flow passages 21 can be carried out more easily, as the rolling force becomes higher, cracks and material damages might be caused when a rolling force of 500 kgf/cm² or more is applied to the porous member that is lower in porosity.

Moreover, in order to prevent the metal mold and the porous member that is lower in the porosity from being made tightly in contact with each other after rolling processes by the rolling machine, a mold releasing agent may be preliminarily applied to one of them. As the mold releasing agent, although any agent may be selected on demand within a range giving no influences to the power generation performances of the fuel cell, distilled water or distilled water containing a diluted surfactant is preferably used. In place of the mold releasing agent, a sheet made of a PTFE resin may be used. As the material for the metal molds, selection may be made from the group consisting of tool steels, such as stainless steel, titanium alloy steel, nickel chromium molybdenum steel, hard alloy steel, SKD11, SKD12, and Ni—P hardened chromium, ceramics, glass-fiber reinforced plastic materials, and the like. Furthermore, the surface of the metal mold may be subjected to a surface treatment, such as hard Cr plating, PVD coating, TiC coating, TD treatment, Zr flame coating, PTFE coating, and the like, in order to improve the corrosion resistance and mold releasing property. The same is true also in the case where a metal mold with protruding portions is directly formed on the surface of the roll.

According to the first embodiment, since the porosity of the rib portion 22 is made lower than the porosity of the rib lower area 23, it is possible to suppress the deformation of the rib portion 22 and excessive permeation of the reaction gas, and consequently to improve power generation performances. Moreover, even in the case where a base-material-less diffusion layer is used for the gas diffusion layer 14, since the deformation of the rib portion 22 can be suppressed by lowering the porosity of the rib portion 22, the production process can be simplified in comparison with that of a gas diffusion layer using carbon fibers as the base material, thereby making it possible to suppress the production costs.

Moreover, according to the first embodiment, the gas diffusion layer 14 in which the porosity of the rib portion 22 is made lower than the porosity of the rib lower area 23 can be produced by using a simple producing method in which the porous member M14 is rolled by using a metal mold 32 with protruding portions 32a, each having a triangular cross-sectional shape.

The porosity can be measured by using the following method.

First, an apparent true density of a produced gas diffusion layer is calculated from the true density and compounding ratio of each of materials forming the gas diffusion layer.

Next, by measuring the weight, thickness and longitudinal and lateral dimensions of the produced gas diffusion layer, the density of the produced gas diffusion layer is calculated.

By substituting the density and apparent true density of the gas diffusion layer thus calculated for the following expression: porosity=(density of gas diffusion layer)/(apparent true density)×100, the porosity is calculated.

As described above, the porosity of the produced gas diffusion layer can be measured.

Additionally, when the pore diameter distribution of the produced gas diffusion layer is measured by using a mercury porosimeter, it is confirmed that the porosity that can be calculated based upon accumulated amount of pores is coincident with the porosity calculated as described above.

Figure 5:
FIG. 5 is a cross-sectional view that shows a first modified example of a cross-sectional shape of a metal mold.
Figure 6:
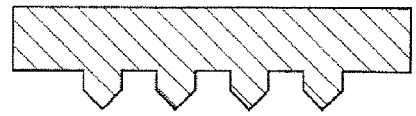
FIG. 6 is a cross-sectional view that shows a second modified example of the cross-sectional shape of the metal mold.
Figure 7:
FIG. 7 is a cross-sectional view that shows a third modified example of the cross-sectional shape of the metal mold.

The present invention is not intended to be limited by the first embodiment, and can be achieved by employing various other modes. For example, in the above-mentioned mode, the cross-sectional shape of each protruding portion 32a of the metal mold 32 is a triangle, and the gas flow passage 21 having a triangular cross-sectional shape is formed; however, the present invention is not intended to be limited by this. As the cross-sectional shape of the protruding portion 32a of the metal mold 32, any shape may be used as long as it is narrowed toward tip of the protruding portion 32a. In addition to the triangle, examples of this shape include a trapezoidal shape, as shown in FIG. 5, a pentagonal shape, as shown in FIG. 6, and a triangular shape with rounded tip portions, as shown in FIG. 7. Since these shapes allow the rib portion 22 to be pressed in compressing direction, a production process that makes the porosity of the rib portion 22 lower than the porosity of the rib lower area 23 is available.

Additionally, the porosity of each rib portion 22 is preferably set evenly. Thus, since the reaction gas passing through the gas diffusion layer 14 is evenly supplied to the entire catalyst layer 13 so that it becomes possible to improve the power generation performances. In order to make the porosity of each rib portion 22 uniform, it is preferable to use a metal mold with a plurality of protruding portions, each having a laterally symmetrical cross-sectional shape. For example, when the cross-sectional shape of each protruding portion is a triangle, the triangle is preferably prepared as an isosceles triangle. Moreover, the respective protruding portions are preferably formed with equal intervals. The respective protruding portions are preferably formed into the same shape.

Moreover, in the above-mentioned mode, the gas diffusion layer 14 is formed by executing steps S1 to S6; however, the present invention is not intended by this. For example, another process may be included between the respective steps. Furthermore, in the above-mentioned mode, steps S1 to S4 for producing the sheet-shaped porous member M14 are included in the producing process of the gas diffusion layer 14; however, the present invention is not intended to be limited by this. A preliminarily produced member may be used as the sheet-shaped porous member M14. That is, in this case, as shown in FIG. 8, the gas diffusion layer 14 can be produced by only executing step S5 and step S6.

As shown in FIG. 9, the gas diffusion layer 14 may be produced by executing steps S11 to S14. A description will be given below of a producing method of the gas diffusion layer 14 shown in FIG. 9.

First, in step S11, conductive particles, a polymer resin, a surfactant, and a dispersing solvent are mixed and kneaded with one after another.

In step S12, a kneaded product obtained by the kneading process is rolled on a flat-plate pressing machine, and formed into a sheet-shaped porous member M14.

In step S13, after the sheet-shaped porous member M14 has been disposed between a metal mold 32 having protruding portions 32a, each having a triangular shape in cross section that corresponds to a shape of each gas flow passage 21, and a metal mold 31, the metal molds 31 and 32 are closed so that the sheet-shaped porous member M14 is rolled. Thus, each of the protruding portions 32a is inserted into the first main surface of the sheet-shaped porous member M14 so that each of gas flow passages 21 having a triangular shape in cross section is formed, with the thickness of the porous member being adjusted.

In step S14, the porous member with the gas flow passages 21 formed therein is calcined so that the surfactant and the dispersing solvent are removed from the porous member.

Thus, a gas diffusion layer 14 as shown in FIG. 2 is obtained.

According to the above-mentioned producing method, since the gas flow passages 21 are formed prior to the calcining of the kneaded product, the flowability of the kneaded product is maintained higher so that a distribution of thin and dense portions can be easily formed. Therefore, according to the above-mentioned producing method, the porosity of the rib portion 22 can be positively made lower than the porosity of the rib lower area 23.

In the above-mentioned mode, the sheet-shaped porous member M14 is formed by using a flat-plate pressing machine; however, the present invention is not intended to be limited by this arrangement. For example, the sheet-shaped porous member M14 may be continuously formed (through roll-to-roll processes) by using a roll pressing machine. In this case, the roll diameter, the roll width, and the surface precision of the roll pressing machine can be set on demand, and as the roll diameter becomes greater, the pressure to be applied to the porous member M14 can be made uniformly dispersed. Moreover, as the surface precision becomes higher, the thickness deviations in the porous member M14 can be reduced more effectively. For this reason, it is preferable to use a roll pressing machine having a large roll diameter with high surface precision.

In the aforementioned mode, the sheet-shaped porous member M14 is formed by subjecting the kneaded product to a rolling process using a roll pressing machine or a flat-plate pressing machine; however, the present invention is not intended to be limited by this arrangement. For example, the kneaded product may be loaded into an extruding machine so that the kneaded product can be continuously formed into a sheet shape through a die head of the extruding machine so as to produce a sheet-shaped porous member M14. Moreover, by devising the shape of screws installed in the extruding machine, the screws may have a kneading function so that the kneaded product can be obtained without using the kneader. That is, in this case, the stirring, kneading, and sheet-forming processes of the respective carbon materials can be integrally carried out by a single machine.

Depending on the kneading time, the shape of blades installed in the kneader, the capacity of the kneader, the amounts of loads of the respective materials, the blending quantity of the dispersing solvent, and the blending quantity of the surfactant, a stress (shearing force) to be applied to the respective materials (in particular, to the polymer material) is varied to give influences to the easiness of the succeeding sheet molding process and the strength thereof. In general, as the shearing force becomes higher, the polymer resin is formed into fibers more easily to cause an increase in the mutual binding characteristic of the conductive particles so that the strength of the gas diffusion layer 14 is improved. However, when the shearing force becomes too high, the kneaded product tends to be formed into hard ball states, with the result that an excessive pressure needs to be applied upon forming a sheet after the kneading process, making it difficult to produce a gas diffusion layer.

The calcining temperature and calcining time are desirably set to a temperature and a period of time at which the surfactant and dispersing solvent are evaporated or decomposed. Additionally, when the calcining temperature is too high, the polymer resin is fused to cause a reduction in strength as the gas diffusion layer 14, and the subsequent deterioration of the sheet shape. For this reason, the calcining temperature is preferably set to a temperature up to the melting point (for example, from 330° C. to 350° C., in the case of PTFE) of the polymer resin. Moreover, the evaporating or decomposing temperature of the surfactant can be measured based upon the results of analysis of TG/DTA (Thermo Gravimetry/Differential Thermal Analyzer), or the like, and is generally set to 260° C. or more. Therefore, the calcining temperature is preferably set to 260° C. or more. With respect to the calcining time, it can be set on demand depending on the specifications (volume, wind volume, wind velocity and the like) of the furnace and the number of sheets to be calcined.

The material for the surfactant can be selected on demand depending on the kinds of the carbon material and the dispersing solvent.

Additionally, the surfactant is used in the above-mentioned mode; however, the gas diffusion layer 14 of the first embodiment can be produced without using the surfactant.

Second Embodiment

Figure 10:
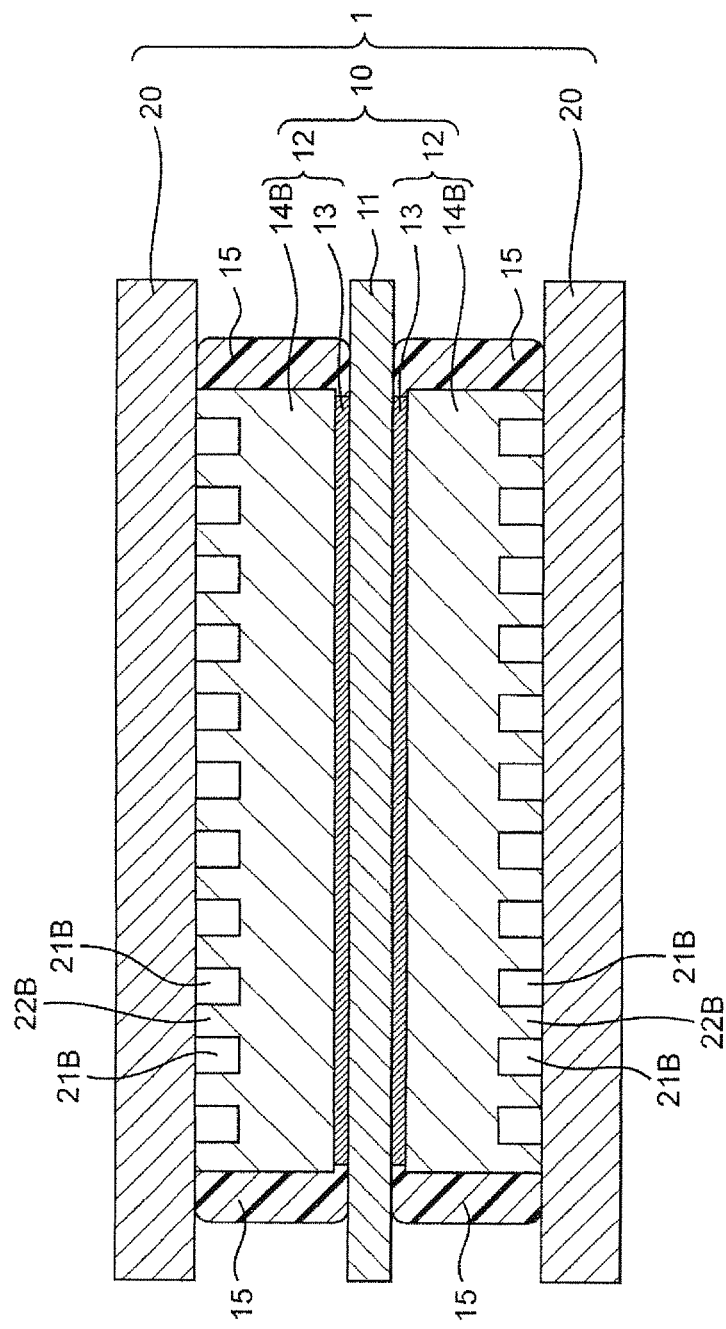
FIG. 10 is a cross-sectional view that schematically shows a basic structure of a fuel cell according to a second embodiment of the present invention.
Figure 11:
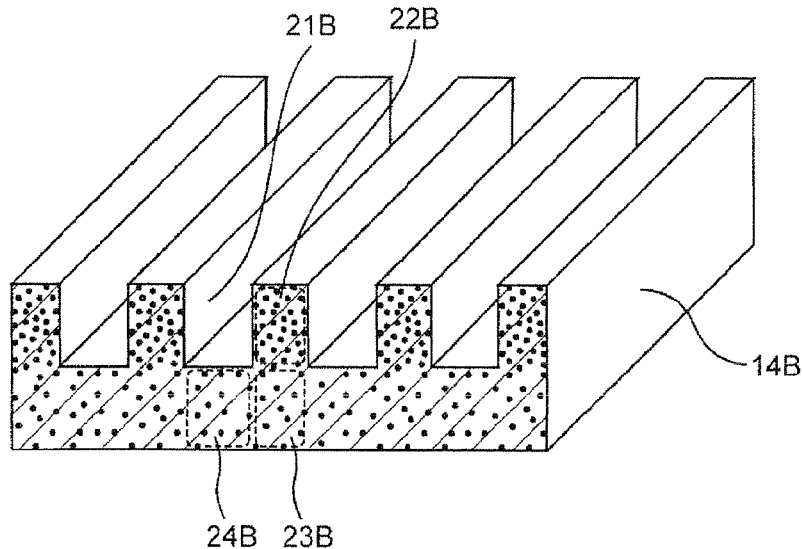
FIG. 11 is an enlarged perspective view that shows a gas diffusion layer provided in the fuel cell shown in FIG. 10.

A description will be given of a fuel cell according to a second embodiment of the present invention. FIG. 10 is a cross-sectional view that schematically shows the basic structure of the fuel cell according to the second embodiment. FIG. 11 is an enlarged perspective view of a gas diffusion layer installed in the fuel cell of FIG. 10. The fuel cell according to the second embodiment is different from the fuel cell of the first embodiment in that the cross-sectional shape of each gas flow passage 21B is prepared as a rectangular shape. In the second embodiment, the porosity of the rib portion 22B is designed to be lower than the porosity of the rib lower area 23B and passage lower area 24B. Additionally, a plurality of black dots in FIG. 11 are used to indicate differences in the porosity for the sake of convenience of explanation.

Figure 12:
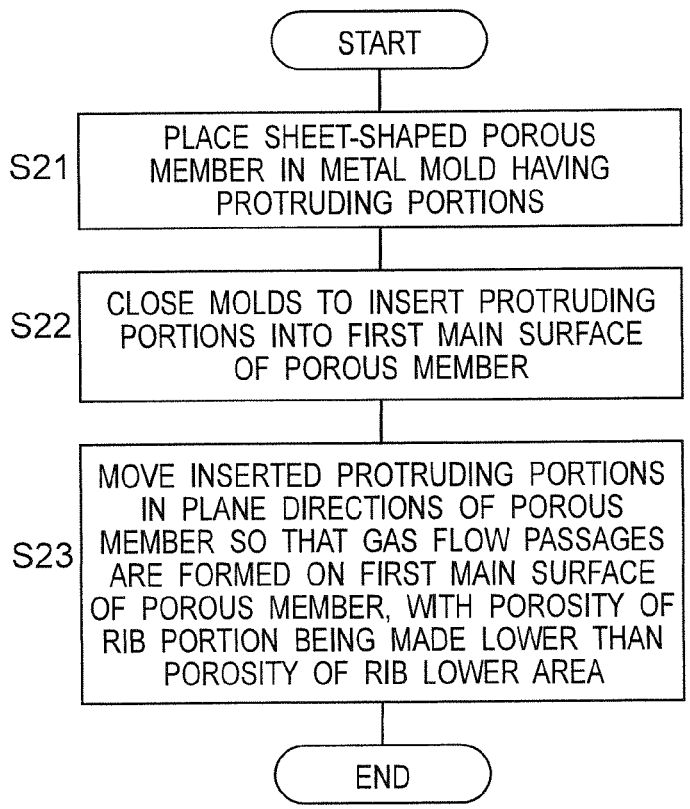
FIG. 12 is a flow chart that shows one example of a method of producing the gas diffusion layer provided in the fuel cell shown in FIG. 10.
Figure 13A:
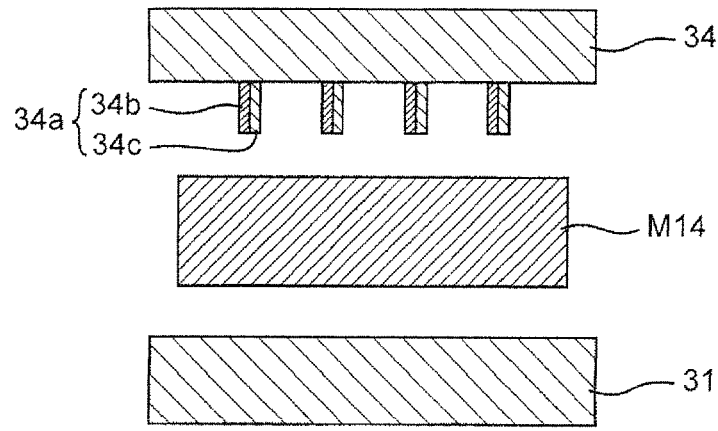
FIG. 13A is an explanatory view that schematically shows one example of the method of producing the gas diffusion layer provided in the fuel cell shown in FIG. 10.
Figure 13B:
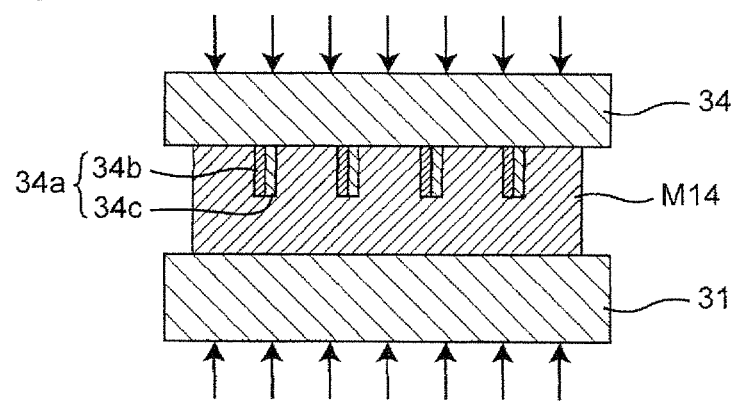
FIG. 13B is an explanatory view that shows processes following those shown in FIG. 13A.
Figure 13C:
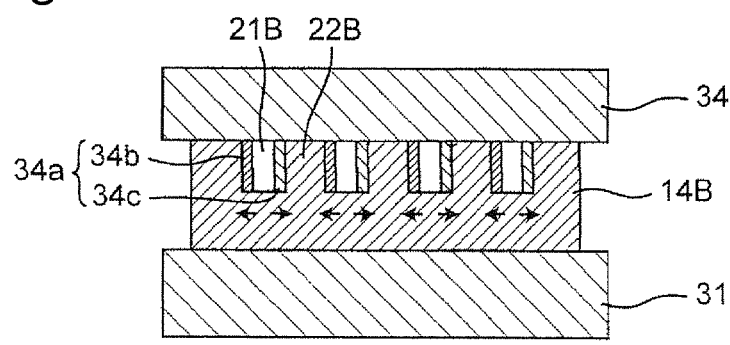
FIG. 13C is an explanatory view that shows processes following those shown in FIG. 13B.

Referring to FIGS. 11, 12, and FIGS. 13A to 13C, a description will now be given of one example of a method of producing a gas diffusion layer 14B according to the second embodiment of the present invention. FIG. 12 is a flow chart showing one example of the producing method of the gas diffusion layer 14B. FIGS. 13A to 13C are explanatory views that schematically show one example of the producing method of the gas diffusion layer 14B.

This method is different from the producing method of the gas diffusion layer 14 of the first embodiment in that, in place of the metal mold 32, a metal mold 34 is used. The metal mold 34 has a plurality of protruding portions 34a, and each of the protruding portions 34a is comprised of two flat plates 34b and 34c that are examples of first and second protrusions. At least one of the flat plates 34b and 34c is designed to be movable in a departing direction from the other. The other points except for this are the same as those of the producing method of the gas diffusion layer 14 of the first embodiment; therefore, the overlapping description will be omitted, and a description will be given mainly of different points.

First, as shown in FIG. 13A, in step S21, a porous member M14 is disposed between the metal molds 31 and 34.

As shown in FIG. 13B, in step S22, the metal molds 31 and 34 are closed so that the porous member M14 is rolled. At this time, each of the protruding portions 34a is inserted into the first main surface of the porous member M14.

In step S23, as shown in FIG. 13C, the flat plates 34b and 34c, which form the protruding portion 34a, are moved in mutually departing directions, that is, in the plane directions of the porous member M14. Thus, a plurality of gas flow passages 21B, each having a rectangular cross-sectional shape, are formed on the porous member M14. At this time, the respective flat plates 34b and 34c are allowed to press the rib portions 22B in compressing direction so that the porosity of each rib portion 22B is made lower than that of the other portions (for example, to 40 to 50%). That is, the porosity of each rib portion 22B is made lower than the porosity of the rib lower area 23B and the passage lower area 24B. Thus, a gas diffusion layer 14B shown in FIG. 11 can be obtained.

According to the second embodiment, since the porosity of the rib portion 22 is made lower than the porosity of the rib lower area 23 and the passage lower area 24B, the deformation of the rib portion 22 and excessive permeation of the reaction gas are prevented, thereby making it possible to improve the power generation performances.

In the case where an attempt is made to form the cross-sectional shape of the gas flow passage 21 into a rectangular shape by utilizing the producing method of the first embodiment, such processes are required in which, after the metal molds 31 and 32 have been once opened, the peripheral portion of the gas flow passage 21 is ground. In contrast, according to the second embodiment, each gas flow passage 21B having a rectangular cross-sectional shape can be formed, with the metal molds 31 and 34 being closed, thereby making it possible to reduce the number of production processes.

Moreover, with respect to the two flat plates 34b and 34c in the metal mold 34, by using a metal mold (not shown) in which only the tip portions thereof are overlapped with each other, while the terminal portions thereof are separated from each other, it is possible to easily produce gas flow passages 21, each having a trapezoidal shape in cross-section.

Additionally, the porosity of the passage lower area 24B is preferably set to 65% or more to less than 80%, in the same manner as in the porosity of the rib lower area 23. In the case where the porosity of the passage lower area 24B is less than 65%, the gas permeability is lowered to cause the reaction gas to hardly flow in the width direction of the gas diffusion layer 14, making it difficult to generate power vertically below the rib portion 22 of the gas flow passage 21B. In contrast, it is difficult to set the porosity of the gas diffusion layer to 80% or more without using carbon fibers as the base material from the viewpoint of production processes. Even if a gas diffusion layer having a porosity of 80% or more was produced, strength would be seriously lowered, failing to exert functions (in particular, durability) as a gas diffusion layer.

A description will now be given in detail of one example of the producing method.

Figure 14:
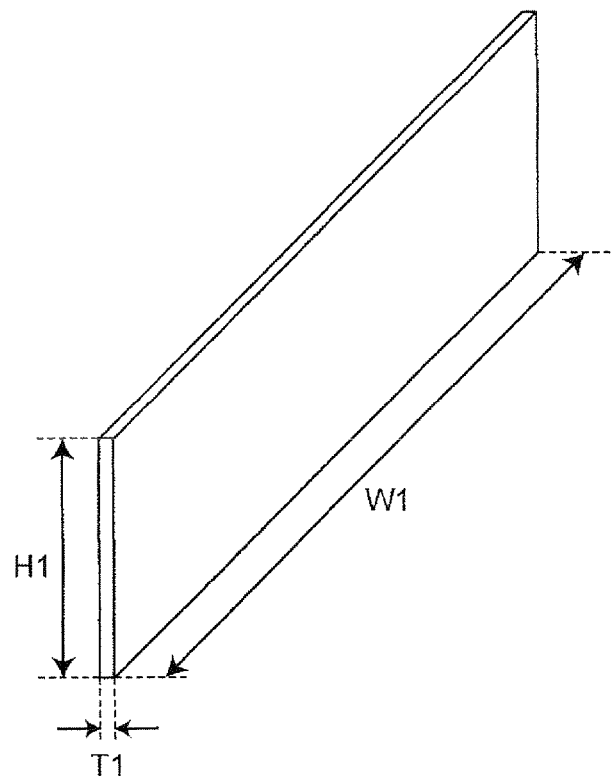
FIG. 14 is a perspective view that shows a flat plate forming a protruding portion formed in the metal mold.

First, a metal mold 34 having four protruding portions 34a, as shown in FIG. 13A, is prepared. The protruding portions 34a, each of which is comprised of two flat plates 34b and 34c made of a titanium alloy, are disposed with an interval of 1.5 mm. As the flat plates 34b and 34c, flat plates, each having a thickness T1 of 0.05 mm, a height H1 of 0.6 mm, and a width W1 of 500 mm, as shown in FIG. 14, are respectively used. As the metal mold 34, a metal mold in which a precise driving mechanism is assembled so as to allow the flat plates 34b and 34c to move in mutually departing directions is used.

Next, as shown in FIG. 13A, a porous member M14 is disposed between the metal mold 31 and the metal mold 34. The porous member M14 that has a porosity of 70% with a thickness of 1 mm is used.

Next, as shown in FIG. 13B, the metal mold 31 and the metal mold 34 are closed, and each of the protruding portions 34a is inserted into the porous member M14, with the flat plate 34b and the flat plate 34c being made in contact with each other.

Next, by driving the driving mechanism assembled into the metal mold 34, the flat plate 34b and flat plate 34c are moved in mutually departing directions, that is, in the plane directions of the porous member M14, by about 500 µm respectively, as shown in FIG. 13C. Thus, four gas flow passages 21, each having a straight shape, with a passage width of 1 mm and a passage depth of 0.6 mm, are simultaneously formed. In this case, the width of the rib portion 22 is set to 0.5 mm.

A gas diffusion layer 14B is produced as described earlier, and when the porosity of each of the rib lower area 23 and the rib portion 22 is measured, for example, the porosity of the rib lower area 23 is 70%, while the porosity of the rib portion 22 is 48%.

In the above-mentioned mode, the four protruding portions 34a are formed in the metal mold 34, and all the four protruding portions 34a are inserted into the porous member M14 so that the four gas flow passages 21B are simultaneously formed; however, the present invention is not intended to be limited by this arrangement. For example, only one protruding portion 34a is formed in the metal mold 34, and by successively inserting the single protruding portion 34a into the porous member M14, the four gas flow passages 21B may be formed individually. When the porosity of each of the rib lower area 23 and the rib portion 22 of the gas diffusion layer 14B produced as described above is measured, for example, the porosity of the rib lower area 23 is 70%, while the porosity of the rib portion 22 is 49%.

Figure 15A:
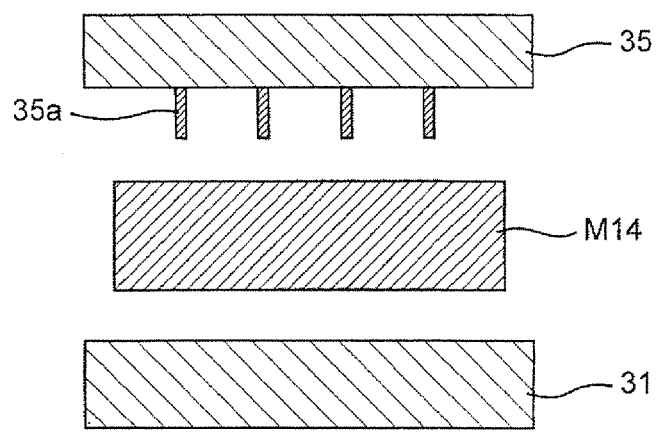
FIG. 15A is an explanatory view that schematically shows a producing method different from the producing methods shown in FIGS. 13A to 13C.
Figure 15B:
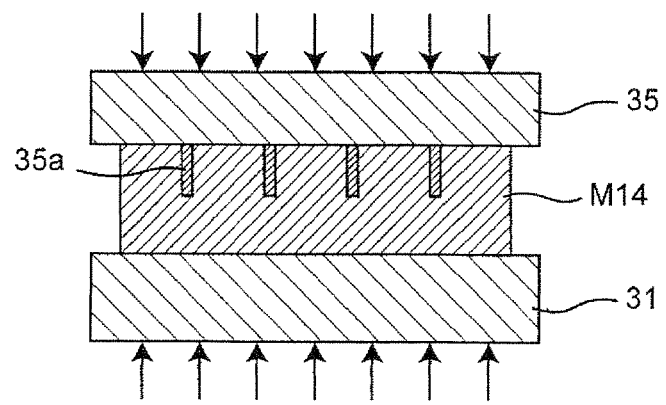
FIG. 15B is an explanatory view that shows processes following those shown in FIG. 15A.
Figure 15C:
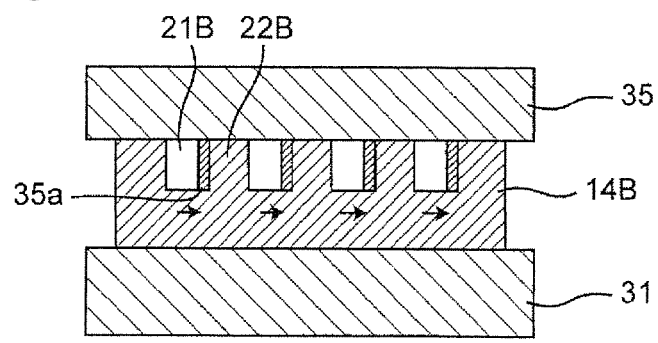
FIG. 15C is an explanatory view that shows processes following those shown in FIG. 15B.

Moreover, the gas diffusion layer 14B according to the second embodiment can be produced by using a producing method as shown in FIGS. 15A to 15C. A description will be given below of the method of producing the gas diffusion layer 14B shown in FIGS. 15A to 15C.

This producing method is different from the producing method of the gas diffusion layer 14 of the first embodiment in that, in place of the metal mold 32, a metal mold 35 is used. The metal mold 35 has a plurality of flat plates 35a, each serving as an example of the protruding portion. The respective flat plates 35a are designed to be movable in plane directions of the porous member M14. The other points except for this are the same as those of the producing method of the gas diffusion layer 14 of the first embodiment; therefore, the overlapping description will be omitted, and a description will be given mainly of different points.

First, as shown in FIG. 15A, the porous member M14 is disposed between the metal molds 31 and 35.

Next, as shown in FIG. 15B, the metal molds 31 and 35 are closed, and the porous member M14 is rolled. At this time, each of the flat plates 35a is inserted into the first main surface of the porous member M14.

Next, as shown in FIG. 15C, the respective flat plates 35a, inserted into the porous member M14, are moved in plane directions of the porous member M14. Thus, each of gas flow passages 21B having a rectangular cross-sectional shape is formed in the porous member M14. At this time, since the respective flat plates 35a press the rib portions 22B in compressing direction so that the porosity of each rib portion 22B becomes lower than that of other portions (for example, to 40 to 50%). In other words, the porosity of the rib portion 22B is made lower than the porosity of the rib lower area 23B and the passage lower area 24B. Thus, a gas diffusion layer 14B as shown in FIG. 11 can be obtained.

A description will now be given in detail of one example of the producing method.

First, a metal mold 35 having four flat plates 35a, as shown in FIG. 15A, is prepared. The flat plates 35a, each of which is comprised of a flat plate made of a titanium alloy, are disposed with an interval of 1.5 mm. As the flat plates 35a, flat plates, each having a thickness T1 of 0.05 mm, a height H1 of 0.6 mm, and a width W1 of 500 mm, as shown in FIG. 14, are respectively used. As the metal mold 35, a metal mold in which a precise driving mechanism is assembled so as to allow the flat plates 35a to move in the plane directions of a porous member M14 is used.

Next, as shown in FIG. 15A, the porous member M14 is disposed between the metal mold 31 and the metal mold 35. The porous member M14 that has a porosity of 70% with a thickness of 1 mm is used.

Next, as shown in FIG. 15B, the metal mold 31 and the metal mold 35 are closed so that each of the flat plates 35a is inserted into the porous member M14.

Next, by driving the driving mechanism assembled into the metal mold 35, the flat plates 35a are moved in plane directions of the porous member M14, by about 1.0 mm respectively, as shown in FIG. 15C. Thus, four gas flow passages 21, each having a straight shape, with a passage width of 1 mm and a passage depth of 0.6 mm, are simultaneously formed. In this case, the width of the rib portion 22 is set to 0.5 mm.

A gas diffusion layer 14B is produced as described earlier, and when the porosity of each of the rib lower area 23 and the rib portion 22 is measured, for example, the porosity of the rib lower area 23 is 70%, while the porosity of the rib portion 22 is 48%.

Third Embodiment

Figure 16:
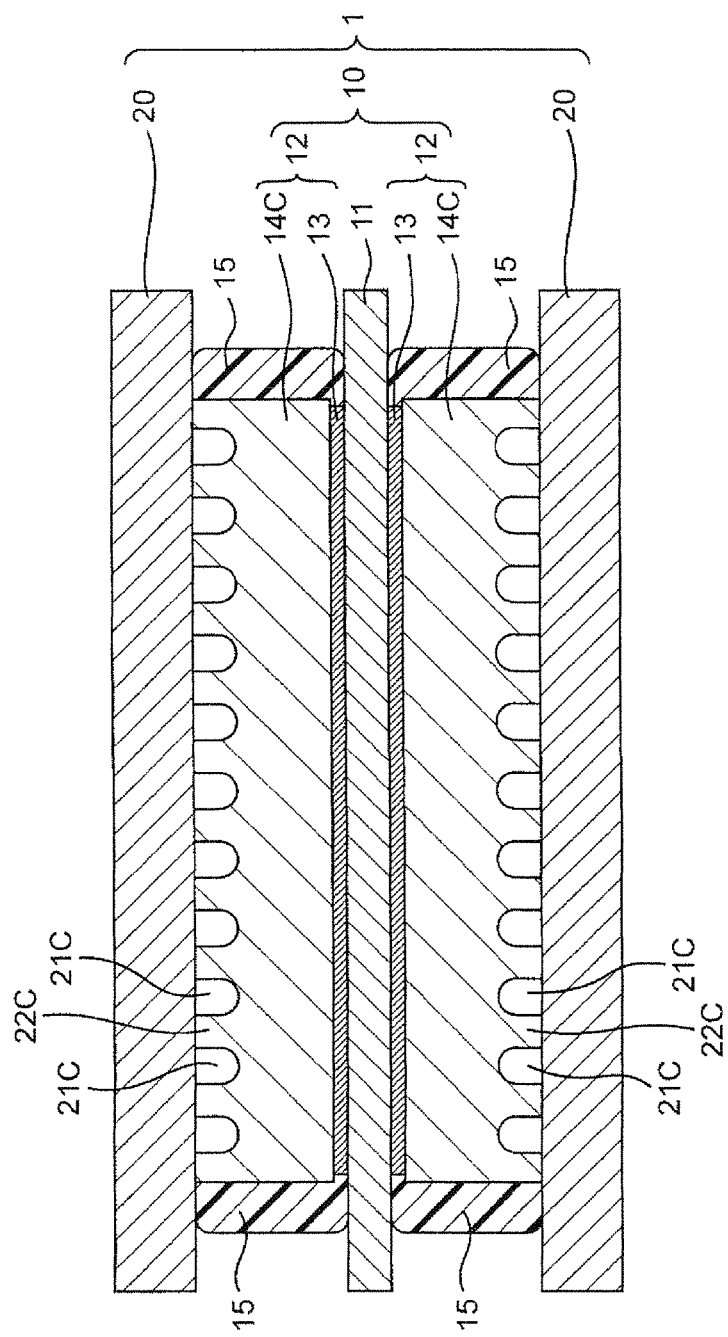
FIG. 16 is a cross-sectional view that schematically shows a basic structure of a fuel cell according to a third embodiment of the present invention.
Figure 17:
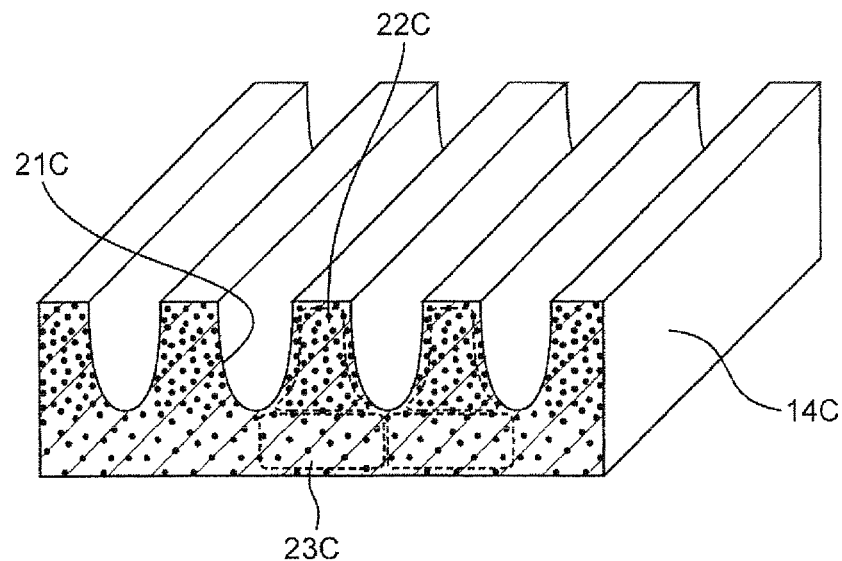
FIG. 17 is an enlarged perspective view that shows a gas diffusion layer provided in the fuel cell shown in FIG. 16.

A description will be given of a fuel cell according to a third embodiment of the present invention. FIG. 16 is a cross-sectional view that schematically shows the basic structure of the fuel cell according to the third embodiment. FIG. 17 is an enlarged perspective view of a gas diffusion layer installed in the fuel cell of FIG. 16. The fuel cell according to the third embodiment is different from the fuel cell of the first embodiment in that the cross-sectional shape of each gas flow passage 21C of the gas diffusion layer 14C is prepared as an arch shape. The other structures except for this point are the same as those of the fuel cell according to the first embodiment. In other words, in the gas diffusion layer 14C, the porosity of each of rib portions 22C is designed to be lower than the porosity of the rib lower area 23C. Additionally, a plurality of black dots in FIG. 17 are used to indicate differences in the porosity for the sake of convenience of explanation.

According to the third embodiment, since the cross-sectional shape of the gas flow passage 21C is prepared as an arch shape, a stress is also exerted in such a direction (plane direction) as to allow the side wall of the arch-shaped gas flow passage 21C to expand toward the rib portion 22C, when a fastening pressure is applied to the entire gas diffusion layer 14C. Thus, the rib portion 22C is made further dense so that the rib portion 22C becomes less susceptible to deformation in comparison with the structure having a rectangular shape in the cross section. Therefore, the strength of the rib portion 22C relative to the fastening pressure to be applied upon assembling the cell 1 can be improved. Consequently, the reduction of the cross-sectional area of the gas flow passage 21C caused by the fastening pressure to be applied upon assembling the cell 1 can be suppressed so that it becomes possible to further improve the power generation performances.

Figure 18:
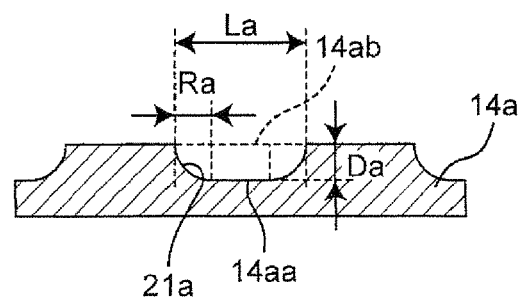
FIG. 18 is an explanatory view that schematically shows one example of a gas flow passage having an arch shape in cross section.
Figure 19:
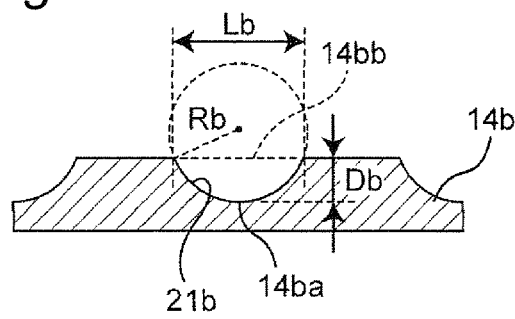
FIG. 19 is an explanatory view that schematically shows another example of the gas flow passage having an arch shape in cross section.

Additionally, the arch-shaped cross-sectional shape also includes a cross-sectional shape having R-shaped corner portions on bottom portion 14aa, as shown in FIG. 18. Moreover, the arch-shaped cross-sectional shape includes a circular cross-sectional shape as shown in FIG. 19.

Figure 21A:
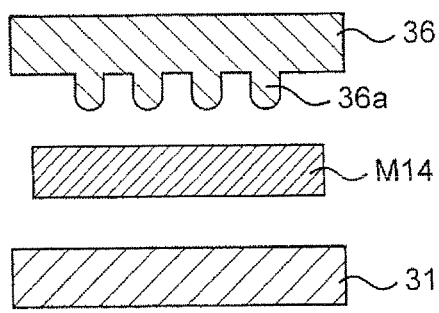
FIG. 21A is an explanatory view that schematically shows one example of the method of producing the gas diffusion layer shown in FIG. 16.
Figure 21B:
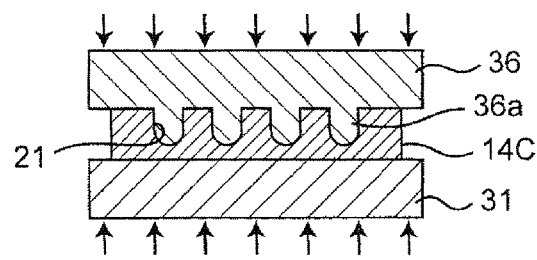
FIG. 21B is an explanatory view that shows processes following those shown in FIG. 21A.

Referring to FIGS. 17, 20, 21A, and 21B, a description will now be given of one example of a method of producing a gas diffusion layer 14B according to the third embodiment of the present invention. FIG. 20 is a flow chart that shows one example of a method of producing a gas diffusion layer 14C according to the third embodiment of the present invention. FIGS. 21A and 21B are explanatory views that schematically show one example of the producing method.

First, in step S31, conductive particles, a polymer resin, a surfactant, and a dispersing solvent are mixed and kneaded with one another.

In step S32, the kneaded product obtained from the kneading process is rolled on a flat-plate pressing machine, and formed into a sheet shape.

In step S33, the kneaded product formed into the sheet shape is calcined so that the surfactant and the dispersing solvent are removed from the kneaded product.

In step S34, the kneaded product from which the surfactant and the dispersing solvent have been removed is again rolled so that thickness is adjusted to produce a sheet-shaped porous member M14.

Additionally, the steps S31 to S34 are the same as those of steps S1 to S4.

In step S35, as shown in FIG. 21A, the porous member M14 is disposed between a metal mold 36 having protruding portions 36a, each having an arch shape in cross section that corresponds to a shape of a gas flow passage 21C, and a metal mold 31.

In step S36, as shown in FIG. 21B, the metal molds 31 and 36 are closed, and a rolling process is carried out. At this time, each of the protruding portions 36a is inserted into the first main surface of the porous member M14 so that each of gas flow passages 21C having an arch shape in cross section is formed. Moreover, in this case, since the protruding portions 36a, each having an arch shape in cross section, press the rib portion 22C in compressing direction so that the porosity of the rib portion 22C becomes lower than that of the other portions (for example, to 40 to 50%). In other words, the porosity of the rib portion 22C is made lower than the porosity of the rib lower area 23C. Thus, a gas diffusion layer 14C as shown in FIG. 17 can be obtained.

Additionally, depending on the curvature and the like of the arch shape, it sometimes becomes difficult to make the porosity of the rib portion 22C lower than the porosity of the rib lower area 23C. For this reason, it is to be noted that the various dimensions, such as the curvature and the like, of the arch shape are set so as to make the porosity of the rib portion 22C lower than the porosity of the rib lower area 23C.

Next, a description will be given of the results of experiments carried out to examine the functions and effects of the gas diffusion layer 14C provided with the arch-shaped gas flow passage 21C according to the third embodiment.

Figure 22:
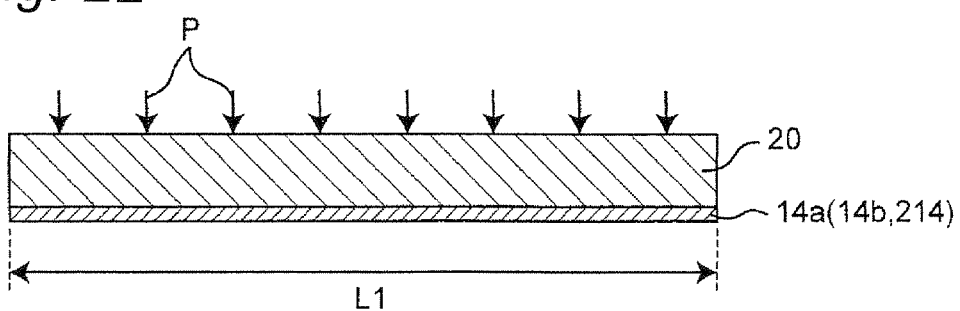
FIG. 22 is a view that shows a state in which a separator is attached to a gas diffusion layer.
Figure 32:
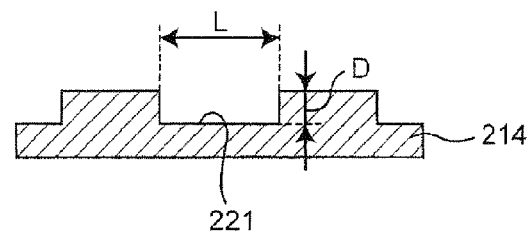
FIG. 32 is an explanatory view that schematically shows a cross-sectional shape of a gas flow passage of a conventional gas diffusion layer.

In this case, three gas diffusion layers: a conventional gas diffusion layer 214 provided with each gas flow passage 221 having a rectangular shape in cross section, as shown in FIG. 32, and gas diffusion layers corresponding to the gas diffusion layer 14C according to the third embodiment provided with the arch-shaped gas flow passage 21C, as shown in FIGS. 18 and 19, were prepared. As shown in FIG. 22, after a separator 20 had been attached to the main surface of each of the gas flow passages 21a, 21b, and 221 of the gas diffusion layers 14a, 14b, and 214, a predetermined pressure was applied thereto so that changes in the cross-sectional area of the gas flow passage were examined.

At this time, the respective cross-sectional areas of the gas flow passages 21a, 21b, and 221 of the gas diffusion layers 14a, 14b, and 214, shown in FIGS. 18, 19, and 32, were designed to be about 0.33 mm². More specifically, the various dimensions were set in the following manner. The width L of the gas flow passage 221 of the conventional gas diffusion layer 214 shown in FIG. 32 was set to 1.1 mm and the depth D thereof was set to 0.3 mm. The width La of an upper portion 14ab of the gas flow passage 21a of the gas diffusion layer 14a according to the third embodiment, shown in FIG. 18, was set to 1.1 mm, and the depth Da thereof was set to 0.3351 mm, and the radius Ra of the R-shaped portion of each of the corner portions of the bottom portion 14ab was set to 0.3 mm. The width Lb of an upper portion 14bb of the gas flow passage 21b of the gas diffusion layer 14b according to the third embodiment, shown in FIG. 19, was set to 1.1 mm, and the depth thereof was set to 0.39 mm, and the radius Rb of an arc portion was set to 1.3 mm. Moreover, the length L1 of each of the gas diffusion layers 14a, 14b, and 214, and the separator 20 was set to 30.35 cm. The Young modulus of each of the gas diffusion layers 14a, 14b, and 214 was set to 2.78 MPa, and the Poisson's ratio thereof was set to 0.3. The Young modulus of the separator 20 was set to 9000 Mpa, and the Poisson's ratio thereof was set to 0.3. Pressure P shown in FIG. 22 was set to 2.0 kgf/cm².

TABLE 1

|  | Cross-sectional area of gas flow passage (mm²) | | Ratio of cross-sectional areas before and after pressure application |
| --- | --- | --- | --- |
|  | Before pressure application | After pressure application |  |
| Conventional gas diffusion layer 214 | 0.330000 | 0.252937 | 76.6% |
| Gas diffusion layer 14a of the present embodiment | 0.330004 | 0.265729 | 80.5% |
| Gas diffusion layer 14b of the present embodiment | 0.330104 | 0.268667 | 81.4% |

Table 1 shows a cross-sectional area before application of a pressure, a cross-sectional area after application of the pressure, and a ratio of cross-sectional areas before and after applications of the pressure of each of the gas flow passages 21a, 21b, and 221 of the gas diffusion layers 14a, 14b, and 214.

Table 1 indicates that the gas diffusion layer 14a of the third embodiment has such an effect as to suppress the reduction of the cross-sectional area of the gas flow passage by 3.9% (=80.5%–76.6%) in comparison with that of the conventional gas diffusion layer 214. Moreover, Table 1 also indicates that the gas diffusion layer 14b of the third embodiment has such an effect as to suppress the reduction of the cross-sectional area of the gas flow passage by 4.8% (=81.4%–76.6%) in comparison with that of the conventional gas diffusion layer 214.

Figure 23:
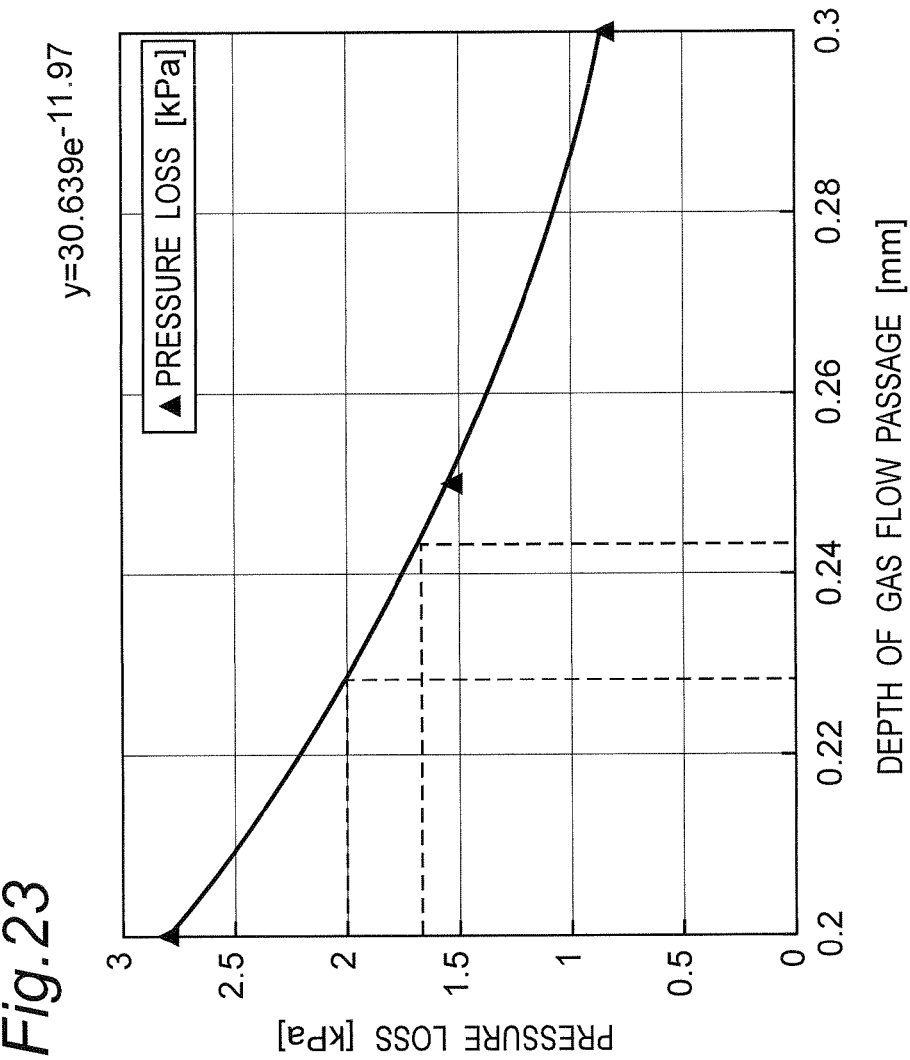
FIG. 23 is a graph that shows a ratio of pressure loss relative to the depth of the gas flow passage.

FIG. 23 is a graph that indicates a ratio of a pressure loss relative to the depth of the gas flow passage, when the passage width of the upper portion of the gas flow passage is fixed to 1.1 mm.

In the case where the depth of each of the gas flow passages 21b and 221 of the gas diffusion layers 14b and 214 before application of a pressure is set to 0.3 mm, upon application of a pressure P of 2.0 kgf/cm², the depths Db and D of the gas flow passages 21b and 221 after the application of the pressure are represented as follows. That is, the depth Db of the gas flow passage 21b after application of the pressure becomes 0.243 mm (=0.3 mm×81.4%), and the depth D of the gas flow passage 221 after the application of the pressure becomes 0.228 mm (=0.3 mm×76.6%).

In FIG. 23, when the depth of the gas flow passage is 0.243 mm, the pressure loss is about 1.7 kPa. In FIG. 23, when the depth of the gas flow passage is 0.228 mm, the pressure loss is about 2.0 kPa. Thus, it is confirmed that the gas diffusion layer 14b of the third embodiment has such an effect as to suppress the pressure loss by 0.3 kPa (=2.0 kPa–1.7 kPa) in comparison with that of the conventional gas diffusion layer 214. In this case, by reducing the pressure loss by 0.3 kPa, it is possible to cut the power consumption by about 1 W.

Figure 24:
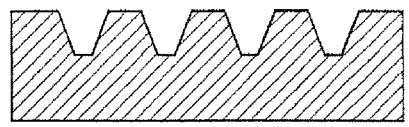
FIG. 24 is a cross-sectional view that shows a first modified example of the cross-sectional shape of the gas flow passage.
Figure 25:
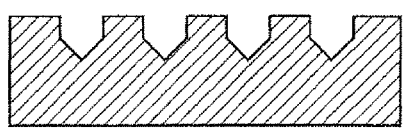
FIG. 25 is a cross-sectional view that shows a second modified example of the cross-sectional shape of the gas flow passage.
Figure 26:
FIG. 26 is a cross-sectional view that shows a third modified example of the cross-sectional shape of the gas flow passage.

Additionally, in the above-mentioned arrangement, the cross section of the gas flow passage 21C is formed into an arch shape; however, the present invention is not intended to be limited by this. For example, the cross section of the gas flow passage 21C may be formed into a trapezoidal shape, as shown in FIG. 24, or may be formed into a pentagonal shape, as shown in FIG. 25. Moreover, the cross-sectional shape of the gas flow passage 21 may be a shape in which tip portions of a triangle are rounded, as shown in FIG. 26. That is, the cross-sectional shape of the gas flow passage 21 may have any shape as long as passage width is widened from the bottom on the catalyst layer 13 side toward the top portion on the separator 20 side. These cross-sectional shapes also make it possible to suppress the deformation of the rib portion in comparison with the conventional structure.

Figure 27:
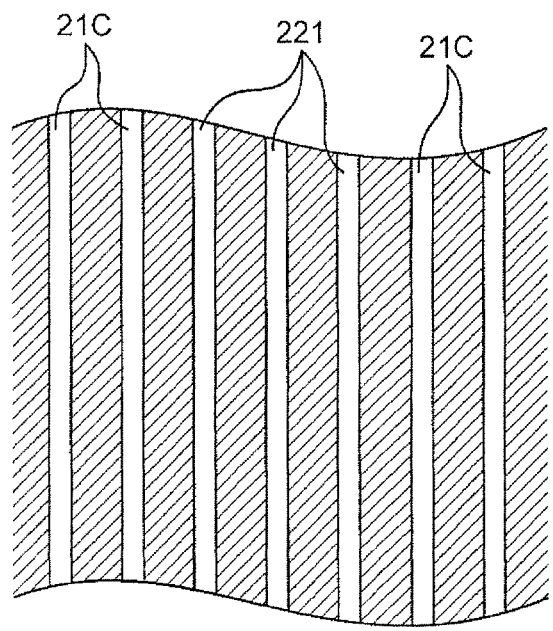
FIG. 27 is a plan view that shows a first modified example of the gas flow passage.
Figure 28:
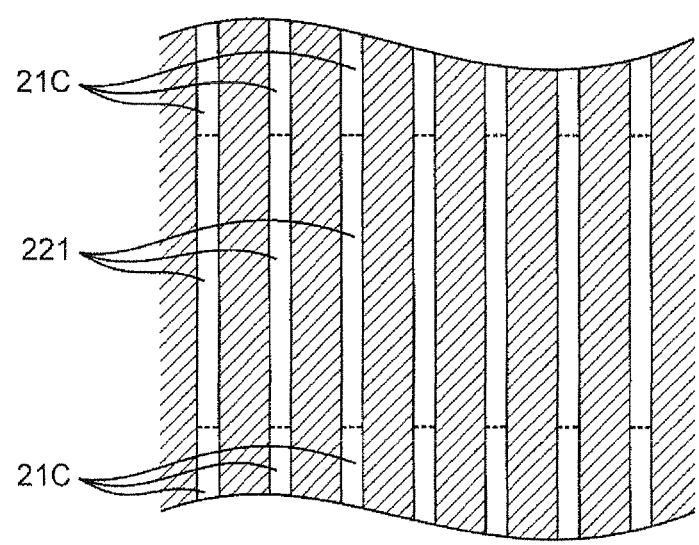
FIG. 28 is a plan view that shows a second modified example of the gas flow passage.

Moreover, it is not necessarily required to form the entire gas flow passage into an arch shape, and it is only necessary to format least one portion into the arch shape. Even in this structure, the power generation performances can be improved in comparison with the conventional structure. Additionally, in the case where the cells 1 are pressurized and fastened to one after another by using fastening members, such as bolts, each of the fastening members is normally inserted into the gas diffusion layer 14C so as to penetrate the peripheral portion thereof. For this reason, a great force tends to be applied, in particular, to the peripheral portion of the gas flow passage 21C. Therefore, in comparison with those gas flow passages located on the center side of the main surface of the gas diffusion layer 14C, those gas flow passages located on the peripheral side of the main surface of the gas diffusion layer 14C tend to be more easily clogged. Therefore, for example, as shown in FIG. 27, those gas flow passages, located on the two end portions of the gas diffusion layer 14C, may be formed into gas flow passages 21C, each having an arch-shaped cross section, and those gas flow passages located between them may be formed into conventional gas flow passages 221, each having a rectangular cross section. Moreover, as shown in FIG. 28, each of a plurality of gas flow passages that are linearly extended may be formed into portions corresponding to the gas flow passage 21C having an arch-shaped cross section and portions corresponding to the conventional gas flow passage 221 having a rectangular cross section.

In the above-mentioned modes, the gas diffusion layers with the gas flow passages according to the present invention are disposed on both of the anode side and the cathode side; however, the present invention is not intended to be limited by this structure. Another structure in which the gas diffusion layer with the passages of the present invention is disposed at least on either one of the anode and cathode sides may be used.

Figure 29:
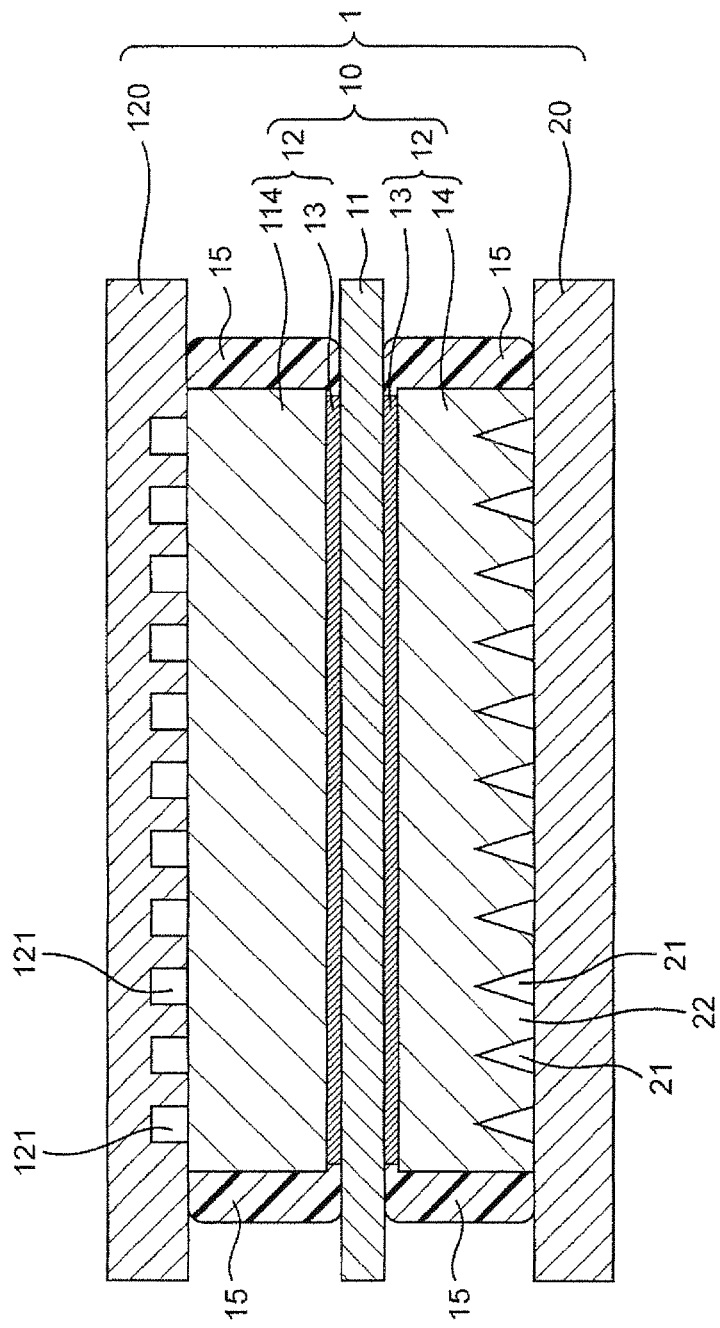
FIG. 29 is a schematic cross-sectional view that shows a modified example of the fuel cell according to the first embodiment of the present invention.
Figure 30:
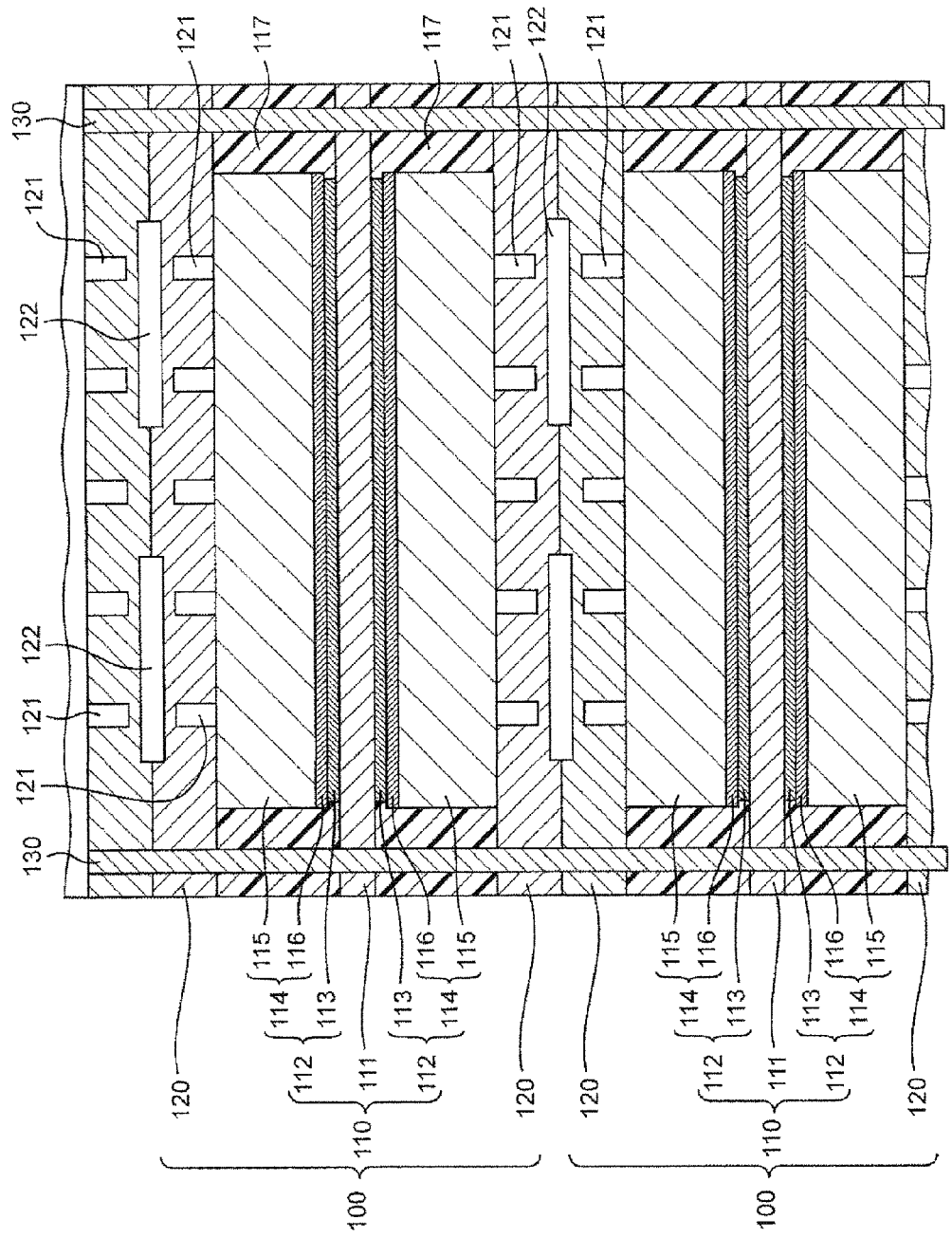
FIG. 30 is a cross-sectional view that schematically shows a basic structure of a conventional fuel cell.

In the case where the oxidant gas flow passage of the cathode electrode (air electrode) is formed into a shape that is more complicated than the fuel gas flow passage of the anode electrode (fuel electrode), the power generation performances of the fuel cell can be more easily improved. However, it is difficult to form a gas flow passage having a complicated shape in a conventional separator comprised of metal, or carbon and resin. In contrast, since the gas diffusion layer with passages according to the present invention is comprised of a base-material-less diffusion layer, the gas flow passages can be easily formed therein. Therefore, for example, as shown in FIG. 29, an arrangement may be made in which, on the anode side, the conventional anode gas diffusion layer 114 and the conventional separator 120 with groove-shaped gas flow passages, that is, fuel gas flow passages 121, formed thereon are disposed, while only on the cathode side, the cathode gas diffusion layer 14 of the present invention with the gas flow passages 21 formed thereon and a separator 20 having a flat shape at least on the surface on the side that is made in contact with the membrane electrode assembly are disposed. In this case, the "flat shape" refers to a shape in which no concave and convex portions are formed from the macroscopic point of view in plane directions of the cathode separator, and for example, corresponds to a shape in which no concave and convex portions serving as reaction gas flow passages are formed by using a pressing machine and a cutting machine. By using this arrangement also, it becomes possible to further improve the power generation performances of the fuel cell in comparison with the conventional structure.

In this case, the porosity of the anode gas diffusion layer 114 is preferably made lower than the porosity of the cathode gas diffusion layer 14. With this arrangement, the water-holding property of the anode gas diffusion layer 114 can be made higher than the water-holding property of the cathode gas diffusion layer 14. Moreover, the gas diffusing characteristic of the cathode gas diffusion layer 14 can be made higher in comparison with the gas diffusing characteristic of the anode gas diffusion layer 114.

INDUSTRIAL APPLICABILITY

Since the membrane electrode assembly and the producing method of the same according to the present invention make it possible to further improve power generation performances of a fuel cell, they can be effectively applied to a fuel cell to be used for a driving source for mobile machines, such as automobiles, distributed power generation systems, home-use cogeneration systems, and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application Nos. 2009-201386 and 2010-178321 both filed on Aug. 9, 2010, including specification, drawings, and claims are incorporated herein by reference in its entirety.

The invention claimed is:

1. A fuel cell comprising:
a membrane electrode assembly;
a first separator; and
a second separator,
wherein the membrane electrode assembly comprises:
   a polymer electrolyte membrane;
   a pair of catalyst layers formed so as to sandwich the polymer electrolyte membrane; and
   paired gas diffusion layers that are formed so as to sandwich the pair of catalyst layers and the polymer electrolyte membrane, the paired gas diffusion layers including a first gas diffusion layer and a second gas diffusion layer,
wherein the first gas diffusion layer is comprised of a porous member mainly comprised of conductive particles and a polymer resin, and is provided with a first main surface and a second main surface positioned on a side opposite to the first main surface, the second main surface being in contact with an adjacent one of the pair of catalyst layers, the first gas diffusion layer including a plurality of longitudinal gas flow passages being formed on a first main surface side of the first gas diffusion layer so as to extend along a length direction of the first gas diffusion layer and so as to be adjacent to one another, and so that a rib portion that separates the mutually adjacent plurality of longitudinal gas flow passages from each other has a porosity that is lower than a porosity of a lower area positioned on a second main surface side below the rib portion, and
wherein the first separator is placed on the first main surface side of the first gas diffusion layer,
wherein the first separator includes a first main surface and a second main surface positioned on a side opposite to the first main surface,
wherein the first main surface of the first separator is in contact with the first main surface of the first gas diffusion layer,
wherein the first main surface of the first separator includes no gas fluid passage which overlaps with one of the plurality of the longitudinal gas flow passages when seen from a thickness direction of the polymer electrolyte membrane,
wherein the second separator includes a first main surface and a second main surface positioned on a side opposite to the first main surface,
wherein the first main surface of the second separator is in contact with the first main surface of the second gas diffusion layer,
wherein the first main surface of the second separator includes a gas fluid passage, and wherein the first main surface of the second gas diffusion layers has no gas fluid passage.

2. The fuel cell according to claim 1, wherein the porosity of the rib portion is lower than a porosity of another lower area positioned on the second main surface side below one of the mutually adjacent plurality of longitudinal gas flow passages.

3. The fuel cell according to claim 1, wherein at least one portion of one of the plurality of longitudinal gas flow passages of the first gas diffusion layer has a cross-sectional shape that allows a passage width to become larger from a bottom portion of the at least one of the plurality of longitudinal gas flow passages toward an upper portion located on the first main surface side.

4. The fuel cell according to claim 3, wherein at least one of the plurality of longitudinal gas flow passages located on a center side of the first main surface of the second separator has a rectangular cross-sectional shape.

5. The fuel cell according to claim 3, wherein all of the plurality of longitudinal gas flow passages of the first gas diffusion layer have a cross-sectional shape that allows a passage width to become larger from the bottom portion toward the upper portion.

6. The fuel cell according to claim 3, wherein the cross-sectional shape that allows the passage width to become larger from the bottom portion toward the upper portion is a triangle.

7. The fuel cell according to claim 3, wherein the cross-sectional shape that allows the passage width to become larger from the bottom portion toward the upper portion is an arch shape.

8. The fuel cell according to claim 3, wherein the cross-sectional shape that allows the passage width to become larger from the bottom portion toward the upper portion is a trapezoidal shape.

9. The fuel cell according to claim 1, wherein the conductive particles are structured with two kinds of carbon materials having mutually different average particle sizes.

10. The fuel cell according to claim 1, wherein the rib portion and the plurality of longitudinal gas flow passages of the first gas diffusion layer extend from one edge of the first gas diffusion layer to an opposite edge of the first gas diffusion layer in a length direction.

11. The fuel cell according to claim 1, wherein no portion of the plurality of longitudinal gas flow passages of the first gas diffusion layer extends completely through the first gas diffusion layer in a thickness direction of the first gas diffusion layer.

* * * * *